US012774431B2

(12) United States Patent
Bouckaert et al.

(10) Patent No.: US 12,774,431 B2
(45) Date of Patent: Oct. 27, 2026

(54) FRESHNESS IMPARTING COMPOSITIONS

(71) Applicant: Firmenich SA, Satigny (CH)

(72) Inventors: Etienne Bouckaert, Plainsboro, NJ (US); Robert Knab, Plainsboro, NJ (US); Arnaud Struillou, Satigny (CH)

(73) Assignee: FIRMENICH SA, Satigny (CH)

( * ) Notice: Subject to any disclaimer, the term of this patent is extended or adjusted under 35 U.S.C. 154(b) by 675 days.

(21) Appl. No.: 18/249,968

(22) PCT Filed: Oct. 21, 2021

(86) PCT No.: PCT/EP2021/079177
§ 371 (c)(1),
(2) Date: Apr. 20, 2023

(87) PCT Pub. No.: WO2022/084437
PCT Pub. Date: Apr. 28, 2022

(65) Prior Publication Data

US 2023/0392098 A1 Dec. 7, 2023

Related U.S. Application Data

(60) Provisional application No. 63/094,435, filed on Oct. 21, 2020.

(30) Foreign Application Priority Data

Nov. 6, 2020 (EP) .................................... 20206074

(51) Int. Cl.
*C11D 3/50* (2006.01)
*C11B 9/00* (2006.01)

(52) U.S. Cl.
CPC .............. *C11D 3/50* (2013.01); *C11B 9/0011* (2013.01); *C11B 9/0034* (2013.01)

(58) Field of Classification Search
CPC ... C11B 9/0011; C11B 9/0003; C11B 9/0015; C11B 9/0034; C11D 3/50; C11D 3/507
USPC .................................................. 512/22, 8, 1
See application file for complete search history.

(56) References Cited

U.S. PATENT DOCUMENTS

| | | | | | |
|---|---|---|---|---|---|
| 3,883,572 | A * | 5/1975 | Helmlinger | A23L 27/203 | 568/42 |
| 7,935,669 | B2 * | 5/2011 | Fehr | C11B 9/0015 | 510/504 |
| 12,264,295 | B2 * | 4/2025 | Struillou | C11D 3/507 | |
| 2015/0217015 | A1 * | 8/2015 | Williams | C11D 3/0068 | 424/76.21 |
| 2017/0274111 | A1 * | 9/2017 | Nwachukwu | C11B 9/0061 | |
| 2019/0093046 | A1 * | 3/2019 | Turner | A61L 9/122 | |
| 2024/0041750 | A1 * | 2/2024 | Verhovnik | A61Q 13/00 | |
| 2024/0043770 | A1 * | 2/2024 | Von Tscharner | C11D 3/2072 | |
| 2024/0376411 | A1 * | 11/2024 | Struillou | C11B 9/0034 | |
| 2025/0263631 | A1 * | 8/2025 | Womack | A61Q 13/00 | |

FOREIGN PATENT DOCUMENTS

| | | | | |
|---|---|---|---|---|
| WO | 84/00542 | A1 | 2/1984 | |
| WO | WO-03049666 | A2 * | 6/2003 | C11B 9/0015 |
| WO | WO-2015119813 | A1 * | 8/2015 | A61L 9/01 |
| WO | 2016/135193 | A1 | 9/2016 | |
| WO | 2017/172568 | A1 | 10/2017 | |
| WO | 2018/037121 | A1 | 3/2018 | |
| WO | 2019/243369 | A1 | 12/2019 | |
| WO | WO-2021123144 | A1 * | 6/2021 | A61Q 13/00 |
| WO | WO-2022063943 | A1 * | 3/2022 | C11D 3/50 |

OTHER PUBLICATIONS

International Search Report and Written Opinion for corresponding International Application No. PCT/EP2021/079177 dated Jan. 31, 2022 (19 pages).

* cited by examiner

*Primary Examiner* — Jessica Whiteley

(57) ABSTRACT

The present invention relates to a method of conferring, improving, enhancing or modifying the freshness of a perfuming composition, the method comprising the step of adding at least one pro-perfume compound to the perfuming composition. The present invention further concerns a perfumed composition comprising at least one pro-perfume compound and at least one perfuming composition, as well as a perfumed consumer product comprising said perfumed composition. The present invention is further directed to the use of least one pro-perfume compound to confer, improve, enhance or modify the freshness of a perfuming composition.

18 Claims, 2 Drawing Sheets

FRESHNESS IMPARTING COMPOSITIONS

This present application is a U.S. national phase entry under 35 U.S.C. § 371 of PCT Application No. PCT/EP2021/079177, filed Oct. 21, 2021, which claims priority to U.S. Provisional Patent Application No. 63/094,435, filed Oct. 21, 2020, and European Patent Application No. 20206074.5, filed Nov. 6, 2020. The entire contents of these applications are explicitly incorporated herein by this reference.

TECHNICAL FIELD

The present invention relates to a method of conferring, improving, enhancing or modifying the freshness of a perfuming composition, the method comprising the step of adding at least one pro-perfume compound to the perfuming composition. The present invention further concerns a perfumed composition comprising at least one pro-perfume compound and at least one perfuming ingredient, as well as a perfumed consumer product comprising said perfumed composition. The present invention is further directed to the use of least one pro-perfume compound to confer, improve, enhance or modify the freshness of a perfuming composition.

BACKGROUND OF THE INVENTION

The perfume industry has a particular interest in additives, which are capable of prolonging and enhancing the perfuming effect of a perfuming composition. Olfactory fresh perfumed compositions are desirable for various applications, as for example fine or functional perfumery or cosmetic preparations. Especially in the field of fabric washing and softening there is a constant need to improve the effect of perfuming ingredients in that they are more effective and perceived as olfactory fresh, in particular over a prolonged period of time, after washing, softening and drying. In this regard, it is particularly desirable to sustain and improve the freshness perception of the laundry as long as possible, as this aspect is considered particularly important by the users of fabric washing products or fabric softeners.

Many active substances which are particularly suitable for this type of application are known to lack tenacity on laundry, or do not remain on the laundry when rinsed, with the result that their perfuming effect and the freshness of the laundry is only experienced briefly and not very intensely. Given the importance of this type of application in the perfume industry, research in this field has been sustained, in particular with the aim of finding new, and more effective solutions to the aforementioned problems.

It has now surprisingly been found that by the addition of a pro-perfume compound to a perfuming composition, the freshness of said perfuming composition can be improved. In particular, it has surprisingly been found that by the addition of a pro-perfume compound, the freshness of a perfuming composition may be enhanced and prolonged.

DETAILED DESCRIPTION

Figure 1:
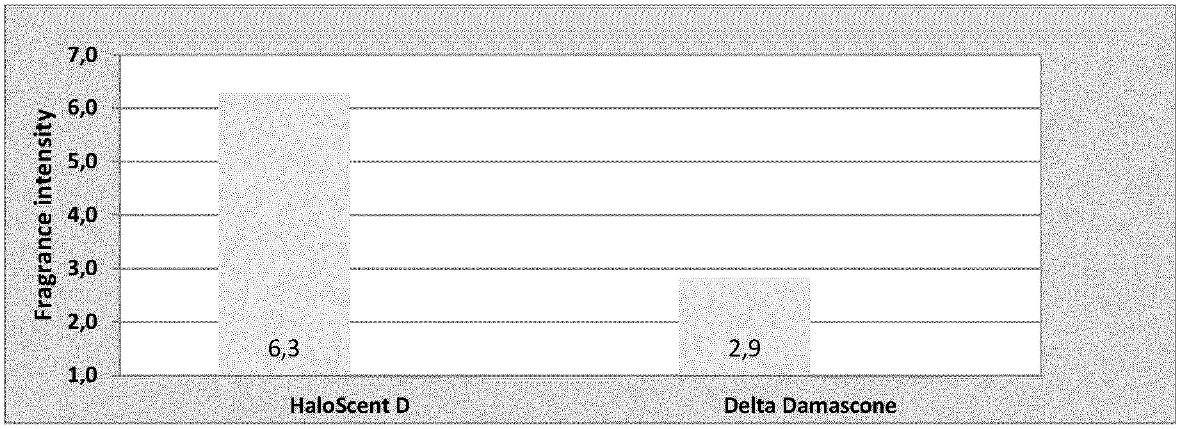
FIG. 1. Comparative sensory evaluation of the fragrance intensity of a towel upon treatment with a fabric softener formulation comprising 3-(dodecylthio)-1-(2,6,6-trimethylcyclohex-3-en-1-yl)butan-1-one (HaloScent® D) or delta-damascone.

Olfaction is a complex and dynamic process and controlling the release profile of volatile fragrance compounds may maximize the impact of fragrance formulations and enrich the sensorial experience upon their use. The addition of a pro-perfume compound to a perfuming composition may add a dimension of control and long-lastingness to the release profile of highly volatile perfumery raw materials (PRMs) in a perfuming composition which leads to an surprisingly improved freshness or fragrance intensity perception over a prolonged period of time.

The present invention relates to a method of conferring, improving, enhancing or modifying the freshness of a perfuming composition or of a perfumed consumer product, the method comprising the step of adding to said composition or perfumed consumer product an effective amount of at least one pro-perfume compound.

In an alternative aspect, the present invention relates to a method of conferring, improving, enhancing or modifying the fragrance intensity of a perfuming composition or of a perfumed consumer product, the method comprising the step of adding to said composition or perfumed consumer product an effective amount of at least one pro-perfume compound.

Under a “perfuming composition” is to be understood a composition that is able to impart a hedonic effect. In other words, a composition to be considered as being a perfuming composition must be recognized by a skilled person in the art of perfumery as being able to impart or modify the olfactory perception in a positive or pleasant way, and not just as imparting an odor.

The odor descriptor referred to as “freshness” is well known to a person skilled in the art. Odor freshness represents an underlying dimension in the perceptual space of perfumery scents. Typically, fresh odors can be found in top notes, which are perceived firstly when smelling a fragrance, while those most dissimilar to fresh are encountered in base notes, such as oriental, powdery, and animalic scents.

The odor descriptor referred to as “fragrance intensity” is also well known to a person skilled in the art. Conferring, improving, enhancing or modifying the fragrance intensity of a perfuming composition describes conferring, improving, enhancing or modifying the fragrance intensity of the main accord or several accords, particularly all accords, of the perfuming composition, i.e. the dominant accord or several accords, particularly all accords, of the perfuming composition.

According to the present invention, at least one pro-perfume compound is added to the perfuming composition.

A pro-perfume or pro-fragrance is a compound that is able to release one, two or up to three perfume compounds, also termed PRMs (perfumery raw materials), upon external influence in a way that the perfuming effect of the PRMs is prolonged. Thereby, the perfumery raw materials are released from the pro-perfume compound by (chemical) cleavage of the pro-perfume compound.

The external influence leading to the cleavage of the pro-perfume compound may be light. By "light", any form of electromagnetic radiation is meant, which is not limited to any particular wavelength. The release of PRMs from such a pro-perfume compound is usually more effective at lower wavelengths (higher energy input).

The cleavage of a certain pro-perfume compound may also be triggered by air/oxygen. Thereby, the PRMs may be released from the pro-perfume compound by oxidation in the presence of air (ambient air) or oxygen.

Moreover, the PRMs may be released from a certain pro-perfume compound by heat. By "heat", it is meant any energy input that is caused by increased temperature.

Further, the PRMs may be released from a certain pro-perfume compound by moisture. Such a pro-perfume compound may show chemical bonds that are susceptible to water-induced cleavage and may thus be cleaved in the presence of water. In some cases, a certain pH-value may induce and/or support the cleavage.

Further, the PRMs may be released from a certain pro-perfume compound upon exposure to enzymes. Such a pro-perfume compound may show chemical bonds that can efficiently be cleaved in the presence of enzymes.

In some cases, the PRMs may be released from a certain pro-perfume compound not only based on one type of release mechanism but based on two or more of the above-mentioned types simultaneously, such as for example release by air/oxygen and moisture.

In a particular embodiment, the pro-perfume compound is a sulfur containing pro-perfume.

In a particular embodiment, the pro-perfume compound is a compound of formula

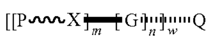

(I)

wherein:

a) w represents an integer from 1 to 10000;

b) n represents 1 or 0;

c) m represents an integer from 1 to 6;

d) P represents a hydrogen atom or a radical susceptible of generating an odoriferous α,β-unsaturated ketone, aldehyde or carboxylic ester and is represented by the formula

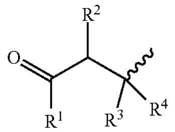

(II)

in which the wavy line indicates the location of the bond between said P and X;

$R^1$ represents a hydrogen atom, a $C_1$ to $C_6$ alkoxyl radical or a $C_1$ to $C_{15}$ linear, cyclic or branched alkyl, alkenyl or alkadienyl radical, possibly substituted by $C_1$ to $C_4$ alkyl groups; and $R^2$, $R^3$ and $R^4$ represent a hydrogen atom, an aromatic ring or a $C_1$ to $C_{15}$ linear, cyclic or branched alkyl, alkenyl or alkadienyl radical, possibly substituted by $C_1$ to $C_4$ alkyl groups; or two, or three, of the groups $R^1$ to $R^4$ are bonded together to form a saturated or unsaturated ring having 5 to 20 carbon atoms and including the carbon atom to which said $R^1$, $R^2$, $R^3$ or $R^4$ groups are bonded, this ring being possibly substituted by $C_1$ to $C_8$ linear, branched or cyclic alkyl or alkenyl groups; and with the proviso that at least one of the P groups is of the formula (II) as defined herein above;

e) X represents a functional group selected from the group consisting of the formulae i) to xiv):

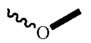

i)

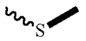

ii)

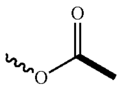

iii)

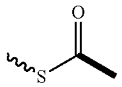

iv)

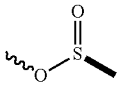

v)

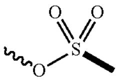

vi)

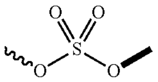

vii)

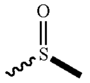

viii)

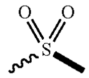

ix)

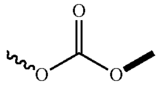

x)

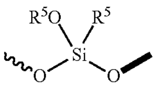

xi)

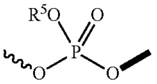

xii)

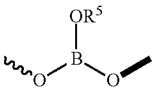

xiii)

-continued xiv)

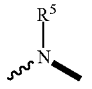

in which formulae the wavy lines are as defined previously and the bold lines indicate the location of the bond between said X and G, and $R^5$ represents a hydrogen atom, a $C_1$ to $C_{22}$, saturated or unsaturated, alkyl group or an aryl group, possibly substituted by $C_1$ to $C_6$ alkyl or alkoxyl groups or halogen atoms; and with the proviso that X may not exist when P represents a hydrogen atom;

f) G represents a multivalent radical (with a m+1 valence) derived from cyclic, linear, alicyclic or branched alkyl, cyclic, linear, alicyclic or branched alkenyl, phenyl, alkylphenyl or alkenylphenyl hydrocarbon radical having from 1 to 22 carbon atoms, said hydrocarbon radical being possibly substituted and containing from 1 to 10 functional groups selected from the group consisting of halogens, alcohols, ethers, esters, ketones, aldehydes, carboxylic acids, thiols, thioethers, amines, quaternary amines and amides; and g) Q represents a hydrogen atom (in which case w=1 and n=1), or represents a polymer or co-polymer selected from the group consisting of poly(alkylimine)s, polypeptides (e.g. polylysine) or polysaccharides selected from the group consisting of cellulose, cyclodextrins and starches, or cationic quaternized silicon polymers, or still a polymer or random co-polymer derived from monomeric units selected from the group consisting of the formulae A-1), A-2), A-3), B-1), B-2), C-1). C-2), and C-3):

A-1)

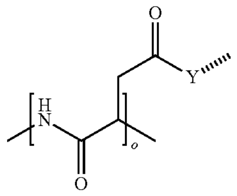

A-2)

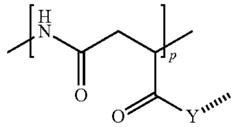

A-3)

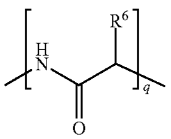

B-1)

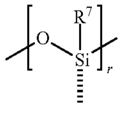

B-2)

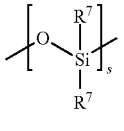

-continued

C-1)

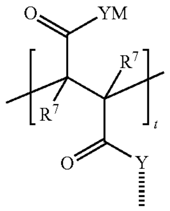

C-2)

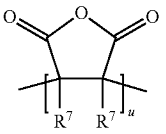

C-3)

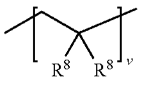

wherein the hatched lines indicate the location of the bond between said monomeric unit and G;

Y represents an oxygen or sulfur atom or a $NR^7$ group;

o, p, q, r, s, t, u and v all represent independent of each other fractions between 0 and 1, with o+p+q=1, r+s=1 and t+u+v=1 and with the proviso that either o or p, as well as r and t are not equal to 0;

$R^6$ represents a hydrogen atom or a side chain from a natural or unnatural amino acid, such as glycine, alanine, phenylalanine, arginine, histidine, lysine, aspartic acid, glutamic acid, cysteine, methionine, glutamine, asparagine, threonine, serine, leucine, isoleucine, valine, tyrosine or tryptophan;

$R^7$ represents, simultaneously or independently, a hydrogen atom or a $C_1$ -$C_{16}$ hydrocarbon group;

$R^8$ represents, simultaneously or independently of each other a hydrogen or halide atom;

a $C_1$-$C_6$ hydrocarbon group optionally comprising from 1 to 4 heteroatoms selected from the group consisting of oxygen and sulfur atoms;

a carboxylic group of formula COOR*, wherein R* represents a hydrogen atom, a $C_1$-$C_{60}$ alkyl or alkenyl group optionally comprising from 1 to 30 oxygen atoms;

a $OR^7$ group or a $COR^7$ group; or a pyrrolidone unit, connected by the nitrogen atom; and M represents a hydrogen atom, an alkali or earth alkali metal ion.

In a particular embodiment, X represents a functional group selected from the group consisting of the formulae ii), iii), viii), ix) and xiv). In a particular embodiment, X represents the functional group of formula ii).

As "odoriferous α,β-unsaturated ketone, aldehyde or carboxylic ester", the expression used in the definition of P, it is understood an α,β-unsaturated ketone, aldehyde or carboxylic ester, which is recognized by a skilled person as being used in perfumery as perfuming ingredient. In general, said odoriferous α,β-unsaturated ketone, aldehyde or carboxylic ester is a compound having from 8 to 20 carbon atoms, or even more preferably between 10 and 15 carbon atoms.

Similarly, it is not possible to provide an exhaustive list of the currently known odoriferous compounds, which can be used in the synthesis of the invention compounds defined hereinabove and subsequently be released. However, the following can be named as preferred examples: alpha-damascone, beta-damascone, gamma-damascone, delta-damascone, alpha-ionone, beta-ionone, gamma-ionone, delta-ionone, beta-damascenone, 1-[6-ethyl-2,6-dimethyl-3-cyclohexen-1-yl]-2-buten-1-one, 2-methyl-1-(2,6,6-trimethylcyclohex-3-en-1-yl)but-2-en-1-one, 3-methyl-5-propyl-2-cyclohexen-1-one, 2-methyl-5-(1-propen-2-yl)-2-cyclohexen-1-one, 2,5-dimethyl-5-phenyl-1-hexen-3-one, 1-(5,5-dimethyl-1-cyclohexen-1-yl)-4-penten-1-one, 3,7-dimethylocta-2,6-dienal, 8-methyl-alpha-ionone or 10-methyl-alpha-ionone, 2-octenal, 1-(2,2,3,6- tetramethylcyclohexyl)but-2-en-1-one, 4-(2,2,3,6-tetramethylcyclohexyl)but-3-en-2-one, 2-cyclopentadecen-1-one, 4,4a-dimethyl-6-(1-propen-2-yl)-4,4a,5,6,7,8-hexahydro-2(3H)-naphthalenone, (E)-3-phenylprop-2-enal (cinnamic) aldehyde, 2,6,6-trimethylspiro[bicyclo[3.1.1]heptane-3,1'-cyclohexan]-2'-en-4'-one, ethyl 2,4-deca-dienoate, ethyl 2-octenoate, methyl 2-nonenoate, ethyl 2,4-undecadienoate, 4-methylpent-3-en-2-one, oct-2-en-4-one, and methyl 5,9-dimethyl-2,4,8- decatrienoate.

In a particular embodiment, P represents a radical selected from the group consisting of formulae (P-1) to (P-14), in the form of any one of its isomers:

(P-1)

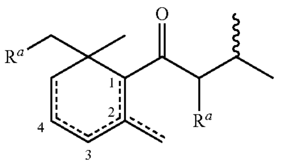

(P-2)

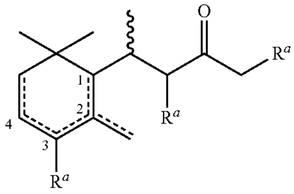

(P-3)

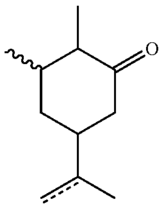

(P-4)

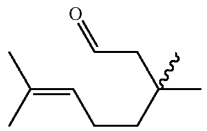

(P-5)

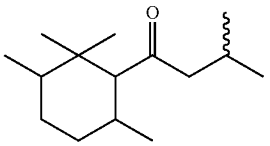

(P-6)

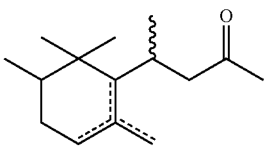

-continued (P-7)

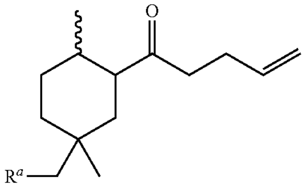

(P-8)

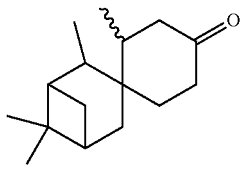

(P-9)

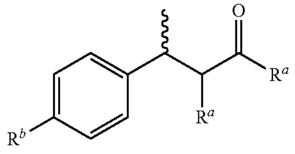

(P-10)

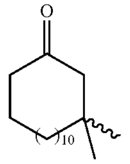

(P-11)

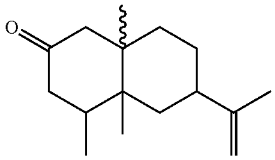

(P-12)

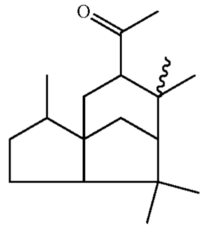

(P-13)

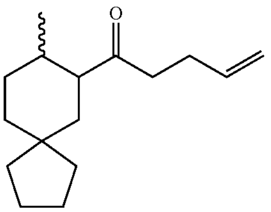

(P-14)

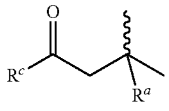

in which formulae the wavy lines have the meaning indicated above and the dotted lines represent a single or double bond, $R^a$ being a hydrogen atom or a methyl group and $R^b$ representing a hydrogen atom, a hydroxyl or methoxy group or a $C_1$ -$C_4$ linear or branched alkyl group and Rc representing a hydrogen atom or a $C_1$ -$C_4$ linear or branched alkyl group.

In a particular embodiment, P represents a radical selected from the group consisting of formulae (P-1)'

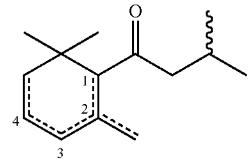

(P-2)'

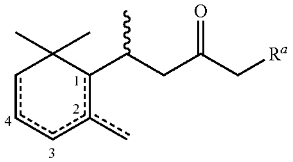

(P-3)

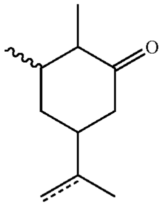

(P-5)

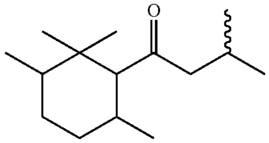

(P-6)

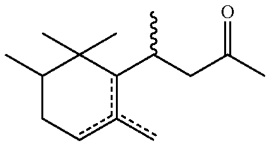

(P-7)

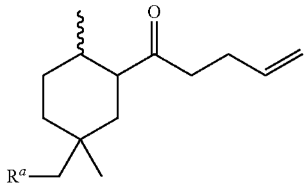

(P-13)

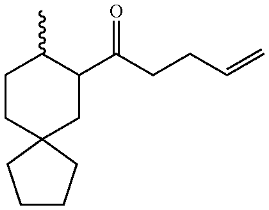

(P-14)'

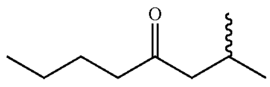

wherein the wavy lines have the meaning indicated above and the dotted lines represent a single or double bond, and $R^a$ being a hydrogen atom or a methyl group.

In a particular embodiment, P represents a radical selected from the group consisting of formulae (P-1), (P-2), (P-1)', (P-2)', (P-3), (P-7), (P-13), (P-14) or (P-14)' as defined above. Preferably, P represents a radical selected from the group consisting of formulae (P-1), (P-1)', (P-2), (P-2)', (P-3) or (P-14)' as defined above.

In a particular embodiment, G may represent a divalent cyclic, linear, alicyclic or branched alkyl, alkenyl, alkandienyl or alkylbenzene hydrocarbon radical having from 1 to 22 carbon atoms, said hydrocarbon radical being possibly substituted and containing from 1 to 10 functional groups selected from the group consisting of ethers, esters, ketones, aldehydes, carboxylic acids, thiols, thioethers, amines, quaternary amines and amides.

In a particular embodiment, G represents a divalent linear or branched alkyl or alkenyl hydrocarbon radical having from 1 to 22 carbon atoms, said hydrocarbon radical being possibly substituted and containing from 1 to 5 functional groups selected from the group consisting of ethers, esters, ketones, aldehydes, carboxylic acids, thiols, thioethers, amines, quaternary amines and amides.

In a particular embodiment, G represents a divalent linear or branched alkyl or alkenyl hydrocarbon radical having from 2 to 15 carbon atoms, said hydrocarbon radical being possibly substituted and containing from 1 to 2 functional groups selected from the group consisting of ethers and esters.

In a particular embodiment, G represents a divalent linear alky or alkenlyl hydrocarbon radical having from 3 to 15 carbon atoms, said hydrocarbon radical being possibly substituted and containing one ester functional group.

In a particular embodiment, G represents a divalent linear alkyl or alkenlyl hydrocarbon radical having from 3 to 14 carbon atoms.

In a particular embodiment, Q represents a hydrogen atom or a co-polymer comprising at least one repeating unit of formula B-1 as defined above.

In a particular embodiment, Q represents a hydrogen atom or a co-polymer comprising at least one repeating unit of formula B-1 and at least one repeating unit of formula B-2.

In a particular embodiment, $R^7$ represents, simultaneously or independently, a hydrogen atom or a $C_{1-3}$ alkyl group. Preferably, $R^7$ represents, simultaneously or independently, a hydrogen atom or a methyl or an ethyl group. More preferably, $R^7$ represents, simultaneously or independently, a hydrogen atom or a methyl group.

In a particular embodiment, the pro-perfume compound is defined by formula (I) as mentioned above, wherein w=1; n=1; m=1;

P represents a radical susceptible of generating an odoriferous α,β-unsaturated ketone, aldehyde and is represented by the formula (II)

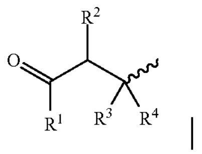

wherein $R^2$, $R^3$ and $R^4$ represent independently of each other a hydrogen atom, a $C_6$ to $C_{10}$ aromatic ring, or a $C_1$ to $C_{15}$ linear, cyclic or branched alkyl, alkenyl or alkadienyl radical, possibly substituted by $C_1$ to $C_4$ alkyl groups; or two, or three, of the groups $R^1$ to $R^4$ are bonded together to form a saturated or unsaturated ring having 5 to 20 carbon atoms and including the carbon atom to which said $R^1$, $R^2$, $R^3$ or $R^4$ groups are bonded, this ring being possibly substituted by $C_1$ to $C_8$ linear, branched or cyclic alkyl or alkenyl groups;

X represents formula ii)

G represents a divalent radical derived from cyclic, linear or branched alkyl, alkenyl, phenyl, alkylphenyl or alkenylphenyl hydrocarbon radical having from 2 to 8 carbon atoms optionally comprising 1 or 2 oxygen, sulfur and/or nitrogen atoms Q represents a polymer or random co-polymer derived from formula B-1), wherein $R^7$ represents a $C_1$-$C_{16}$ hydrocarbon group.

In a particular embodiment, the sulfur-containing pro-perfume compound is a linear polysiloxane co-polymer comprising at least one repeating unit of formula (III)

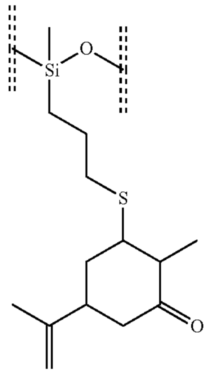

wherein the double hatched lines indicate the bonding to another repeating unit.

The pro-perfume of formula (III) releases 2-methyl-5-(prop-1-en-2-yl)cyclohex-2-en-1-one as fragrance compound, which is also known as carvone. Carvone exists in the form of two enantiomers, namely (R)-(−)-2-methyl-5-(1-propen-2-y0-2-cyclohexen-1-one (I-carvone or carvone laevo) and (S)-(+)-2-methyl-5-(1-propen-2-y0-2-cyclohexen-1-one (d-carvone or 20 carvone dextro). The two enantiomers have been reported to have slightly different mint odor tonalities. Nevertheless, both enantiomers are expected to have a similar effect in view of the preparation of the co-polymer and the release efficiency..

In a particular embodiment, the sulfur-containing pro-perfume compound is of formula (IV)

$$P—S—G—Q \quad (IV)$$

wherein

P has the same meaning as defined above:

G represents a divalent radical derived from a linear or branched alkyl or alkenyl radical having from 2 to 15 carbon atoms, possibly substituted with one or more groups selected from the group consisting of —$OR^9$, —$N(R^9)_2$, —$COOR^9$ and $R^9$ groups, in which $R^9$ represents a hydrogen atom or a $C_1$ to $C_6$ alkyl or alkenyl group; and Q represents a hydrogen atom.

In a particular embodiment, the pro-perfume compound of formula (I) is a compound of formulae a) to d)

a)

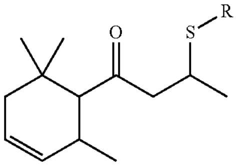

b)

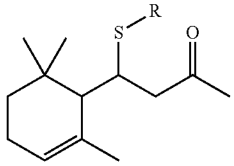

c)

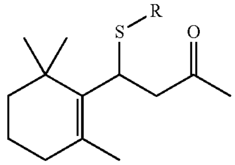

d)

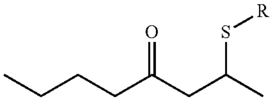

or any combination thereof;

wherein R represents a $C_1$-$C_{20}$ alkyl or alkenyl group, preferably a $C_6$-$C_{15}$ alkyl or alkenyl group, more preferably a $C_{12}$ alkyl group.

In a particular embodiment, the pro-perfume compound of formula (I) may be selected from the group consisting of methyl or ethyl 2-(4-oxo-4-(2,6,6-trimethylcyclohex-3-en-1-yl)butan-2-ylamino)-3-(4-oxo-4-(2,6,6-trimethylcyclohex-3-en-1-yl)butan-2-ylthio)propanate, methyl or ethyl 2-(4-oxo-4-(2,6,6-trimethylcyclohex-2-en-1-yl)butan-2-ylamino)-3-(4-oxo-4-(2,6,6-trimethylcyclohex-2-en-1-yl)butan-2-ylthio)propanate, methyl or ethyl 2-(2-oxo-4-(2,6,6-trimethylcyclohex-1-en-1-yl)butan-4-ylamino)-3-(2-oxo-4-(2,6,6-trimethylcyclohex-1-en-1-yl)butan-4-ylthio)propanate, methyl or ethyl 2-(2-oxo-4-(2,6,6-trimethylcyclohex-2-en-1-yl)butan-4-ylamino)-3-(2-oxo-4-(2,6,6-trimethylcyclohex-2-en-1-yl)butan-4-ylthio)propanate, 3-(dodecylthio)-1-(2,6,6-trimethylcyclohex-3-en-1-yl)-1-butanone, 3-(dodecylthio)-1-(2,6,6-trimethylcyclohex-2-en-1-yl)-1-butanone, 4-(dodecylthio)-4-(2,6,6-trimethylcyclohex-2-en-1-yl)-2-butanone, 4-(dodecylthio)-4-(2,6,6-trimethylcyclohex-1-en-1-yl)-2-butanone, 2-dodecylsulfanyl-5-methyl-heptan-4-one, 2-cyclohexyl-1-dodecylsulfanyl-hept-6-en-3-one, 3-(dodecylthio)-5-isopropenyl-2-methylcyclohexanone, 2-(dodecylthio)-4-octanone, 2-(dodecylsulfonyl)octan-4-one, 4-(dodecylthio)-4-methyl-pentan-2-one, methyl or ethyl N,S-bis(4-oxo-4-(2,6,6-trimethylcyclohex-3-en-1-yl)butan-2-yl)-L-cystei nate, methyl or ethyl S-(4-oxo-4-(2,6,6-trimethylcyclohex-3-en-1- yl)butan-2-yl)-L-cysteinate, 4-oxooctan-2-yl dodecanoate, and any mixtures thereof. Preferably, the pro-perfume compound of formula (I) may be selected from the group consisting of 3-(dodecylthio)-1-(2,6,6-trimethylcyclohex-3-en-1-yl)butan-1-one (Haloscent® D), 3-(dodecylthio)-1-(2,6,6-trimethylcyclohex-2-en-1-yl)butan-1-one, 4-(dodecylthio)-4-(2,6,6-trimethylcyclohex-2-en-1-yl)butan-2-one (Haloscent® I) and 4-(dodecylthio)-4-(2,6,6-trimethylcyclohex-1-en-1-yl)butan-2-one (Haloscent® I), 2-(dodecylthio)-4-octanone, 2-(dodecylsulfonyl)octan-4-one, 4-(dodecylthio)-4-methylpentan-2-one, methyl or ethyl N,S-bis (4-oxo-4-(2,6,6-trimethylcyclohex-3-en-1-yl)butan-2-yl)-L-cysteinate, methyl or ethyl S-(4-oxo-4-(2,6,6-trimethylcyclohex-3-en-1-yl)butan-2-yl)-L-cystei nate and 4-oxooctan-2-yl dodecanoate, or any mixtures thereof. Preferably, the pro-perfume compound of formula (I) may be 3-(dodecylthio)-1-(2,6,6-trimethylcyclohex-3-en-1-yl)butan-1-one (HaloScent® D), 4-(dodecylthio)-4-(2,6,6-trimethylcyclohex-2-en-1-yl)butan-2-one (HaloScent® I), 4-(dodecylthio)-4-(2,6,6-trimethylcyclohex-1-en-1-yl)butan-2-one (HaloScent® I), or a mixture thereof. Preferably, the pro-perfume compound of formula (I) may be a mixture of 3-(dodecylthio)-1-(2,6,6-trimethylcyclohex-3-en-1-yl) butan-1-one (HaloScent® D), 4-(dodecylthio)-4-(2,6,6-trimethylcyclohex-1-en-1-yl)butan-2-one (HaloScent® I) and 4-(dodecylthio)-4-(2,6,6-trimethylcyclohex-2-en-1-yl) butan-2-one (HaloScent® I).

In a particular embodiment, only one pro-perfume compound is added to the perfuming composition to confer, improve, enhance or modify the freshness of the perfuming composition. Preferably, the one pro-perfume compound is 3-(dodecylthio)-1-(2,6,6-trimethylcyclohex-3-en-1-yl)butan-1-one (HaloScent® D) or 4-(dodecylthio)-4-(2,6,6-trimethylcyclohex-2-en-1-yl)butan-2-one (HaloScent® I).

In a particular embodiment, two pro-perfume compounds are added to the perfuming composition to confer, improve, enhance or modify the freshness of the perfuming composition or perfumed consumer product. Preferably, the two pro-perfume compounds are 3-(dodecylthio)-1-(2,6,6-trimethylcyclohex-3-en-1-yl)butan-1-one (HaloScent® D) and 4-(dodecylthio)-4-(2,6,6-trimethylcyclohex-2-en-1-yl)butan-2-one (HaloScent® I).

In a particular embodiment, the perfuming composition or perfumed consumer product comprises at least one perfuming ingredient imparting fruity and/or woody and/or fresh and/or floral odor note and/or green odor note.

The odor descriptors fruity, woody, fresh, floral, and green are common odor descriptors in the perfume industry and are well known to a skilled person.

In a preferred embodiment, the perfuming composition comprises at least one perfuming ingredient imparting fruity odor note and/or at least one perfuming ingredient imparting woody odor note and/or at least one perfuming ingredient imparting fresh odor note and/or at least one perfuming ingredient imparting floral odor note. Preferably, the perfuming composition comprises at least one perfuming ingredient imparting fresh odor note. More preferably, the perfuming composition comprises at least one perfuming ingredient imparting fresh odor note and/or at least one perfuming ingredient imparting floral odor note.

Preferably, the perfuming composition comprises at least one perfuming ingredient imparting fruity odor note, at least one perfuming ingredient imparting woody odor note, at least one perfuming ingredient imparting fresh odor note, and at least one perfuming ingredient imparting floral odor note. Even more preferably, the perfuming composition consists of at least one perfuming ingredient imparting fruity odor note, at least one perfuming ingredient imparting woody odor note, at least one perfuming ingredient imparting fresh odor note, and at least one perfuming ingredient imparting floral odor note.

In another preferred embodiment, the perfuming composition comprises at least one perfuming ingredient imparting fruity odor note and/or at least one perfuming ingredient imparting woody odor note and/or at least one perfuming ingredient imparting fresh odor note and/or at least one perfuming ingredient imparting floral odor note and/or at least one perfuming ingredient imparting green odor note.

Preferably, the perfuming composition comprises at least one perfuming ingredient imparting fruity odor note, at least one perfuming ingredient imparting woody odor note, at least one perfuming ingredient imparting fresh odor note, at least one perfuming ingredient imparting floral odor note, and at least one perfuming ingredient imparting green odor note. Even more preferably, the perfuming composition consists of at least one perfuming ingredient imparting fruity odor note, at least one perfuming ingredient imparting woody odor note, at least one perfuming ingredient imparting fresh odor note, at least one perfuming ingredient imparting floral odor note, and at least one perfuming ingredient imparting green odor note.

According to any embodiments of the invention, the perfuming composition comprises at least one perfuming ingredient imparting fruity odor note in an amount comprised between to 25 wt. %, based on the total weight of the perfuming composition, at least one perfuming ingredient imparting woody odor note in an amount comprised between 10 to 20 wt. %, based on the total weight of the perfuming composition, at least one perfuming ingredient imparting fresh odor note in an amount comprised between 10 to 30 wt. %, based on the total weight of the perfuming composition, at least one perfuming ingredient imparting floral odor note in an amount comprised between 30 to 60 wt. %, based on the total weight of the perfuming composition, and at least one perfuming ingredient imparting green odor note in an amount comprised between 0 to 15 wt. %, based on the total weight of the perfuming composition.

In a particular embodiment, the at least one perfuming ingredient imparting fruity odor note is selected from the group consisting of compound groups A, B, C, D, or any mixture thereof, wherein:

- perfuming ingredient of group A is selected from the group consisting of allyl (2-methylbutoxy)acetate, allyl (3-methylbutoxy)acetate, allyl (cyclohexyloxy)acetate, 1-(5,5-dimethyl-1-cyclohexen-1-yl)-4-penten-1-one, 1-(3,3-dimethyl-1-cyclohexen-1-yl)-4-penten-1-one, 1-(5-ethyl-5-methyl-1-cyclohexen-1-yl)-4-penten-1-one, 1-[(1RS,2SR,4SR)-bicyclo[2.2.1]hept-2-yl]-5-hexen-2-one,1-(spiro[4.5]dec-7-en-7-Apent-4-en-1-one, 2-cyclohexyl-1,6-heptadien-3-one, diethyl 1,4-cyclohexanedicarboxylate, (−)-(2S)-1-oxo-1-(2-propanyloxy)-2-propanyl 2,2-dimethylpropanoate, (+/−)-3,7-dimethyl-1,6-octadien-3-ol, or any combination thereof;
- perfuming ingredient of group B is selected from the group consisting of benzyl acetate, benzyl propionate, 4-phenyl-2-butanone, cyclohexyl acetate, 3-methyl-2-buten-1-yl acetate, or any combination thereof;
- perfuming ingredient of group C is selected from the group consisting of 5-heptyldihydro-2(3H)-furanone, 6-hexyltetrahydro-(2H)-pyran-2-one, 2,2,5-trimethyl-5-pentylcyclopentanone, 4-decanolide, (1'R)-2-[2-(4'-methyl-3'-cyclohexen-1'-yl)propyl]cyclopentanone, 2-(5-hexen-1-yl)cyclopentanone, or any combination thereof;
- perfuming ingredient of group D is selected from the group consisting of tricyclo[5.2.1.0$^{2,6}$]dec-3-en-8-yl acetate, tricyclo[5.2.1.0$^{2,6}$]dec-4-en-8-yl acetate, tricyclo [5.2.1.0$^{2,6}$]dec-3-en-8-yl propanoate, tricyclo [5.2.1.0$^{2,6}$]dec-4-en-8-yl propanoate, (1R/S,2R/S,6R/S,7R/S,8S/R)-tricyclo[5.2.1.0$^{2,6}$]dec-3-en-8-yl 2-methylpropanoate, (1R/S,2R/S,6R/S,7R/S,8S/R)-tricyclo[5.2.1.0$^{2,6}$]dec-4-en-8-yl 2-methylpropanoate, or any combination thereof.

Preferably, the at least one perfuming ingredient imparting fruity odor note consists of at least one perfuming ingredient of group C. Preferably the perfuming ingredient of group C is 5-heptyldihydro-2(3H)-furanone.

Preferably, the at least one perfuming ingredient imparting fruity odor note consists of a at least one perfuming ingredient of group D. Preferably the perfuming ingredient of group D is tricyclo[5.2.1.0$^{2,6}$]dec-3-en-8-yl acetate and/or tricyclo[5.2.1.0$^{2,6}$]dec-4-en-8-yl acetate.

Preferably, the at least one perfuming ingredient imparting fruity odor note consists of at least one perfuming ingredient of compound group A, at least one perfuming ingredient of compound group B, at least one perfuming ingredient of compound group C, and at least one perfuming ingredient of compound group D. Preferably, the at least one perfuming ingredient imparting fruity odor note consists of at least one perfuming ingredient of compound group B, at least one perfuming ingredient of compound group C, and at least one perfuming ingredient of compound group D.

Preferably, the at least one perfuming ingredient of compound group A is allyl (2-methylbutoxy)acetate and/or allyl (3-methylbutoxy)acetate and/or diethyl 1,4-cyclohexanedicarboxylate and/or (−)-(2S)-1-oxo-1-(2-propanyloxy)-2-propanyl 2,2-dimethylpropanoate and/or (+/−)-3,7-dimethyl-1,6-octadien-3-ol. Preferably, the least one perfuming ingredient of compound group B is benzyl acetate. Preferably, the at least one perfuming ingredient of compound group C is 5-heptyldihydro-2(3H)-furanone. Preferably, the at least one perfuming ingredient of compound group D is tricyclo[5.2.1.0$^{2,6}$]dec-3-en-8-yl acetate.

Preferably, the at least one perfuming ingredient imparting fruity odor note is a mixture of allyl (2-methylbutoxy) acetate and/or allyl (3-methylbutoxy)acetate, benzyl acetate, 5-heptyldihydro-2(3H)-furanone, and tricyclo[5.2.1.0$^{2,6}$] dec-3-en-8-yl acetate.

In another preferred embodiment, the at least one perfuming ingredient imparting fruity odor note is a mixture of benzyl acetate, diethyl 1,4-cyclohexanedicarboxylate, (+/−)-3,7-dimethyl-1,6-octadien-3-ol, 3-methyl-2-buten-1-yl acetate, (−)-(2S)-1-oxo-1-(2-propanyloxy)-2-propanyl 2,2-dimethylpropanoate, (+/−)-5-heptyldihydro-2(3H)-furanone, (+/−)-2,2,5-trimethyl-5-pentylcyclopentanone, and tricyclo[5.2.1.0$^{2,6}$]dec-3-en-8-yl acetate.

In another preferred embodiment, the at least one perfuming ingredient imparting fruity odor note is a mixture of allyl (2-methylbutoxy)acetate, allyl (3-methylbutoxy)acetate, benzyl acetate, (+/−)-5-heptyldihydro-2(3H)-furanone, (+/−)-3,7-dimethyl-1,6-octadien-3-ol, (−)-(2S)-1-oxo-1-(2-propanyloxy)-2-propanyl 2,2-dimethylpropanoate, and tricyclo[5.2.1.0$^{2,6}$]dec-3-en-8-yl acetate.

Preferably, allyl (2-methylbutoxy)acetate and/or allyl (3-methylbutoxy)acetate amount to 1 to 5 wt. %, preferably 1.5 to 4 wt. %, even more preferably 2 to 4 wt. %, of the at least one perfuming ingredient imparting fruity odor note.

Preferably, benzyl acetate amounts to 5 to 15 wt. %, preferably 10 to 15 wt. %, even more preferably 11 to 14 wt. %, of the at least one perfuming ingredient imparting fruity odor note. In another embodiment, benzyl acetate amounts to 20 to 35 wt. %, preferably, 25 to 30 wt. %, of the at least one perfuming ingredient imparting fruity odor note.

Preferably, 5-heptyldihydro-2(3H)-furanone amounts to 20 to 60 wt. %, preferably 25 to 60 wt. %, preferably 40 to 60 wt% or 50 to 60 wt% of the at least one perfuming ingredient imparting fruity odor note. In another embodiment, 5-heptyldihydro-2(3H)-furanone amounts to 10 to 30 wt. %, preferably, 15 to 20 wt. %, of the at least one perfuming ingredient imparting fruity odor note.

Preferably, tricyclo[5.2.1.0$^{2,6}$]dec-3-en-8-yl acetate amounts to 20 to 35 wt. %, preferably 25 to 35 wt. %, preferably 25 to 32 wt. %, of the at least one perfuming ingredient imparting fruity odor note. In another embodiment, tricyclo[5.2.1.0$^{2,6}$]dec-3-en-8-yl acetate amounts to 15 to 35 wt. %, preferably, 15 to 30 wt. %, of the at least one perfuming ingredient imparting fruity odor note.

Preferably, diethyl 1,4-cyclohexanedicarboxylate amounts to 2 to 20 wt. %, preferably 5 to 10 wt. % of the at least one perfuming ingredient imparting fruity odor note.

Preferably, (+/−)-3,7-dimethyl-1,6-octadien-3-ol amounts to 10 to 40 wt. %, preferably 15 to wt. % of the at least one perfuming ingredient imparting fruity odor note.

Preferably, 3-methyl-2-buten-1-yl acetate amounts to 0.5 to 5 wt. %, preferably 1 to 3 wt. % of the at least one perfuming ingredient imparting fruity odor note.

Preferably, (−)-(2S)-1-oxo-1-(2-propanyloxy)-2-propanyl 2,2-dimethylpropanoate amounts to 1 to 10 wt. %, preferably 4 to 9 wt. % of the at least one perfuming ingredient imparting fruity odor note.

Preferably, (+/−)-2,2,5-trimethyl-5-pentylcyclopentanone amounts to 2 to 20 wt. %, preferably 5 to 10 wt. % of the at least one perfuming ingredient imparting fruity odor note.

Further examples of perfuming ingredients imparting fruity odor note are: gamma-undecalactone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3, 3-dimethylcyclohexyl]ethyl [3-ethyl-2-oxiranyl]acetate and/or diethyl 1,4-cyclohexane dicarboxylate.

In a particular embodiment, the at least one perfuming ingredient imparting woody odor note is selected from the group consisting of compound groups E, F, G, H, or any mixture thereof, wherein:

- perfuming ingredient of group E is selected from the group consisting of 4-(2-methyl-2-propanyl)cyclohexyl acetate, 1-(octahydro-2,3,8,8-tetramethyl-2-naphtalenyl)-1-ethanone, 4-(2-methyl-2-propanyl)cyclohexanol, patchouli oil, (+/−)-methyl 2-ethylhexanoate, 1-[(1RS,2RS)-1,2,8,8-tetramethyl-1,2,3,4,5,6,7,8-octahydro-2-naphthalenyl]ethanone, 14(2RS,3RS)-2,3,8,8-tetramethyl-1,2,3,4,5,6,7,8-octahydronaphthalen-2-Aethanone, 1-[(2RS,3RS,8aRS)-2,3,8,8-tetramethyl-1,2,3,5,6,7,8,8a-octahydro-2-naphthalenyl]ethenone, 1-[(1RS,2RS,8aSR)-1,2,8,8-tetramethyl-1,2 3,5,6,7,8,8a-octahydro-2-naphthalenyl]ethanone, cedarwood oil, or any combination thereof;
- perfuming ingredient of group F is selected from the group consisting of (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, (E)-3-methyl-4-(2,6,6-trimethyl-2-cyclohexen-1-yl)-3-buten-2-one, or any combination thereof;
- perfuming ingredient of group G is selected from the group consisting of 3,7-dimethyl-1,6-octadien-3-ol, 3,7-dimethyl-1,6-nonadien-3-ol, 3,7-dimethyl-1-octen-3-ol, 3,7-dimethyl-3-octanol, 4-cyclohexyl-2-methyl-2-butanol, propyl 2-(tert-pentyloxy)propanoate, (2Z)-4,8-dimethyl-2,7-nonadien-4-ol, or any combination thereof;

perfuming ingredient of group H is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S,8S/R)-tricyclo[5.2.1.$0^{2,6}$]dec-3-en-8-yl 2-methyl propanoate, (1R/S,2 R/S,6 R/S, 7R/S, 8S/R)-tricyclo[5.2. 1.$0^{2,6}$]dec-4-en-8-yl 2-methylpropanoate, or any combination thereof.

The expression "patchouli oil" as mentioned above, designates any oil extracted from patchouli, any terpenes fractions of patchouli oil or Clearwood® (origin: Firmenich SA, Geneva, Switzerland).

Preferably, the at least one perfuming ingredient imparting woody odor note consists of a at least one perfuming ingredient of group E. Preferably the perfuming ingredient of group E is 4-(2-methyl-2-propanyl)cyclohexyl acetate.

Preferably, the at least one perfuming ingredient imparting woody odor note consists of a at least one perfuming ingredient of group H. Preferably the perfuming ingredient of group H is tricyclo[5.2.1.$0^{2,6}$]dec-3-en-8-yl acetate and/or tricyclo[5.2.1.$0^{2,6}$]dec-4-en-8-yl acetate.

Preferably, the at least one perfuming ingredient imparting woody odor note consists of at least one perfuming ingredient of compound group E, at least one perfuming ingredient of compound group F, at least one perfuming ingredient of compound group G, and at least one perfuming ingredient of compound group H.

Preferably, the at least one perfuming ingredient of compound group E is 4-(2-methyl-2-propanyl)cyclohexyl acetate and/or patchouli oil and/or (+/−)-methyl 2-ethylhexanoate and/or 1-[(1RS,2RS)-1,2,8,8-tetramethyl-1,2,3,4,5,6,7,8-octahydro-2-naphthalenyl]ethenone and/or 14(2RS,3RS)-2,3,8,8-tetramethyl-1,2,3,4,5,6,7,8-octahydronaphthalen-2-yl)ethenone and/or 1-[(2RS,3RS,8aRS)-2,3,8,8-tetramethyl-1,2,3,5,6,7,8,8a-octahydro-2-naphthalenyl]ethenone and/or 1-[(1RS,2RS,8aSR)-1,2,8,8-tetramethyl-1,2,3,5,6,7,8,8a-octahydro-2-naphthalenyl] ethanone. Preferably, the at least one perfuming ingredient of compound group F is (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one. Preferably, the at least one perfuming ingredient of compound group G is 3,7-dimethyl-1,6-octadien-3-ol. Preferably, the at least one perfuming ingredient of compound group H is tricyclo[5.2.1.$0^{2,6}$]dec-3-en-8-yl acetate.

Preferably, the at least one perfuming ingredient imparting woody odor note is a mixture of 4-(2-methyl-2-propanyl)cyclohexyl acetate, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, 3,7-dimethyl-1,6-octadien-3-ol, and tricyclo[5.2.1.$0^{2,6}$]dec-3-en-8-yl acetate.

In another preferred embodiment, the at least one perfuming ingredient imparting woody odor note is a mixture of patchouli oil, (+/−)-methyl 2-ethylhexanoate, 1-[(1RS,2RS)-1,2,8,8-tetramethyl-1,2,3,4,5,6,7,8-octahydro-2-naphthalenyl]ethanone, 14(2RS,3RS)-2,3,8,8-tetramethyl-1,2,3,4,5,6,7,8-octahydronaphthalen-2-Aethanone, 1-[(2RS,3RS,8aRS)-10 2,3,8,8-tetramethyl-1,2,3,5,6,7,8,8a-octahydro-2-naphthalenyl]ethanone, 1-[(1RS,2RS,8aSR)-1,2,8,8-tetramethyl-1,2,3,5,6,7,8,8a-octahydro-2-naphthalenyl] ethanone, 4-(2-methyl-2-propanyl)cyclohexyl acetate, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, and tricyclo[5.2.1.$0^{2,6}$]dec-3-en-8-yl acetate.

In another preferred embodiment, the at least one perfuming ingredient imparting woody odor note is a mixture of cedarwood oil, patchouli oil, 4-(2-methyl-2-propanyl)cyclohexyl acetate, (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, 3,7-dimethyl-1,6-octadien-3-ol, 1-20 [(1RS,2RS)-1,2,8,8-tetramethyl-1,2,3,4,5,6,7,8-octahydro-2-naphthalenyl]ethanone, 1-((2RS,3RS)-2,3,8,8-tetramethyl-1,2,3,4,5,6,7,8-octahydronaphthalen-2-Aethanone, 1-[(2 RS,3RS,8aRS)-2,3,8,8-tetramethyl-1,2,3,5,6, 7,8,8a-octahydro-2-naphthalenyl]ethanone, 1-[(1RS,2 RS,8aSR)-1,2,8, 8-tetramethyl-1,2,3,5,6, 7,8,8a-octahydro-2-naphthalenyl]ethenone and (1R/S,2 R/S,6R/S,7 R/S,8S/R)-25 tricyclo[5.2.1.$0^{2,6}$]dec-3-en-8-yl 2-methyl propanoate, (1R/S,2R/S,6R/S,7R/S,8S/R)-tricyclo[5.2.1.$0^{2,6}$]dec-4-en-8-yl2-methylpropanoate.

Preferably, 4-(2-methyl-2-propanyl)cyclohexyl acetate amounts to 35 to 60 wt. %, preferably 38 to 60 wt. %, preferably 40 to 60 wt. %, even more preferably 45 to 55 wt. % of the at least 30 one perfuming ingredient imparting woody odor note. In another embodiment, 4-(2-methyl-2-propanyl)cyclohexyl acetate amounts to 1 to 30 wt. %, preferably 15 to 20 wt. %, of the at least one perfuming ingredient imparting woody odor note.

Preferably, (+/−)-(3E)-3-methyl-4-(2,6,6-trimethyl-2-cyclohexen-1-yl)-3-buten-2-one and (+/−35)-(1E)-1-(2,6,6-trimethyl-2-cyclohexen-1-yl)-1-penten-3-one amount to 4 to 10 wt. %, preferably 5 to 8 wt. %, of the at least one perfuming ingredient imparting woody odor note. In another embodiment, (+/−)-(3E)-3-methyl-4-(2,6,6-trimethyl-2-cyclohexen-1-yl)-3-buten- 2-one and (+/−)-(1E)-1-(2,6,6-trimethyl-2-cyclohexen-1-yl)-1-penten-3-one amount to 1 to wt. %, preferably 10 to 15 wt. %, of the at least one perfuming ingredient imparting woody odor note.

Preferably, 3,7-dimethyl-1,6-octadien-3-ol amounts to 15 to 25 wt. %, preferably 17 to 22 wt. %, of the at least one perfuming ingredient imparting woody odor note. In another embodiment, 3,7-dimethyl-1,6-octadien-3-ol amounts to 20 to 50 wt. %, preferably 30 to 40 wt. %, of the at least one perfuming ingredient imparting woody odor note.

Preferably, tricyclo[5.2.1.$0^{2,6}$]dec-3-en-8-yl acetate amounts to 15 to 25 wt. %, preferably 17 to 22 wt. %, of the at least one perfuming ingredient imparting woody odor note.

Preferably, patchouli oil amounts to 2 to 20 wt. %, preferably 5 to 10 wt. %, of the at least one perfuming ingredient imparting woody odor note. In another embodiment, patchouli oil amounts to 0.1 to 10 wt. %, preferably 1 to 5 wt. %, of the at least one perfuming ingredient imparting woody odor note.

Preferably, (+/−)-methyl 2-ethylhexanoate amounts to 10 to 40 wt. %, preferably 15 to 30 wt. %, of the at least one perfuming ingredient imparting woody odor note.

Preferably, 1-[(1RS,2RS)-1,2,8,8-tetramethyl-1,2,3,4,5,6,7,8-octahydro-2-naphthalenyl]ethanone/14(2RS,3RS)-2,3,8,8-tetramethyl-1,2,3,4,5,6,7,8-octahydronaphthalen-2-Aethanone/1-[(2RS,3RS,8aRS)-2,3,8,8-tetramethyl-1,2,3,5,6,7,8,8a-octahydro-2-naphthalenyl]ethanone/1-[(1RS,2 RS,8aSR)-1,2,8,8-tetramethyl-1,2,3,5,6,7,8,8a-octahydro-2-naphthalenyl]ethanone amounts to 2 to 20 wt. %, preferably 6 to 15 wt. %, of the at least one perfuming ingredient imparting woody odor note.

Preferably, cedarwood oil amounts to 10 to 30 wt. %, preferably 15 to 20 wt. %, of the at least one perfuming ingredient imparting woody odor note.

Further examples of perfuming ingredients imparting woody odor note are: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2,7}$]undec[4]ene, (1-ethoxyethoxy) cyclododecane, 2,2,9,11-tetramethylspiro[5.5]undec-8-en-1-yl acetate, 1-35 (octahydro-2,3,8,8-tetramethyl-2-naphtalenyl)-1-ethanone, (1'R, E)-2-ethyl-4-(2',2',3'-trimethyl-3'-cyclopenten-t-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-Aethan-1-one and/or isobornyl acetate.

In a particular embodiment, the at least one perfuming ingredient imparting fresh odor note is selected from the group consisting of compound groups I, J, K, L, or any mixture thereof, wherein:

- perfuming ingredient of group I is selected from the group consisting of 10-undecenal, decanal, undecanal, 9-undecenal, 10-undecenal, dodecanal, 2-methylundecanal, 5,9-dimethyl-4-decenal, methyl 2-((1RS,2RS)-3-oxo-2-pentylcyclopentyl)acetate, lavandin oil, or any combination thereof;
- perfuming ingredient of group J is selected from the group consisting of allyl (2-methylbutoxy)acetate, allyl (3-methylbutoxy)acetate, allyl (cyclohexyloxy)acetate, 1-(5,5-dimethyl-1-cyclohexen-1-yl)-4-penten-1-one, 1-(3,3-dimethyl-1-cyclohexen-1-yl)-4-penten-1-one, 1-(5-ethyl-5-methyl-1-cyclohexen-1-yl)-4-penten-1-one, 1-[(1R/S,2S/R,4S/R)-bicyclo[2.2.1]hept-2-yl]-2-cyclohexyl-1,6-heptadien-3-one, or any combination thereof;
- perfuming ingredient of group K is selected from the group consisting of 2,6-dimethyl-7-octen-2-ol, 4-cyclohexyl-2-methyl-2-butanol, dihydroterpineol, 2,6-dimethyl-2-heptanol, 2,6-dimethyl-2-octanol, propyl 2-(tert-pentyloxy)propanoate, (2Z)-4,8-dimethyl-2,7-nonadien-4-ol, or any combination thereof;
- perfuming ingredient of group L is selected from the group consisting of 3,7-dimethyl-1,6-octadien-3-ol (linalool), 3,7-dimethyl-1,6-nonadien-3-ol, 3,7-dimethyl-1-octen-3-ol, 3,7-dimethyl-3-octanol, 4-cyclohexyl-2-methyl-2-butanol, propyl 2-(tert-pentyloxy) propanoate, (2Z)-4,8-dimethyl-2,7-nonadien-4-ol, or any combination thereof.

Preferably, the at least one perfuming ingredient imparting fresh odor note consists of a at least one perfuming ingredient of group I. Preferably the perfuming ingredient of group I is 10-undecenal.

Preferably, the at least one perfuming ingredient imparting fresh odor note consists of at least one perfuming ingredient of compound group I, at least one perfuming ingredient of compound group J, at least one perfuming ingredient of compound group K, and at least one perfuming ingredient of compound group L. Preferably, the at least one perfuming ingredient imparting fresh odor note consists of at least one perfuming ingredient of compound group I, at least one perfuming ingredient of compound group K, and at least one perfuming ingredient of compound group L.

Preferably, the at least one perfuming ingredient of compound group I is 10-undecenal and/or methyl 2-((1RS,2RS)-3-oxo-2-pentylcyclopentyl)acetate and/or lavandin oil. Preferably, the at least one perfuming ingredient of compound group J is allyl (2-methylbutoxy)acetate and/or allyl (3-methylbutoxy)acetate. Preferably, the at least one perfuming ingredient of compound group K is 2,6-dimethyl-7-octen-2-ol. Preferably, the at least one perfuming ingredient of compound group L is 3,7-dimethyl-1,6-octadien-3-ol (linalool).

Preferably, the at least one perfuming ingredient imparting fresh odor note is a mixture of allyl (2-methylbutoxy) acetate and/or allyl (3-methylbutoxy)acetate, 2,6,-dimethyl-7-octen-2-ol, and 3,7-dimethyl-1,6-octadien-3-ol (linalool).

In another preferred embodiment, the at least one perfuming ingredient imparting fresh odor note is a mixture of 10-undecenal, allyl (2-methylbutoxy)acetate and/or allyl (3-methylbutoxy)acetate, 2,6,-dimethyl-7-octen-2-ol, methyl 2-((1RS,2RS)-3-oxo-2- pentylcyclopentyl)acetate, lavandin oil, 3,7-dimethyl-1,6-octadien-3-ol, (+/−)-1-(5-ethyl-5-methyl-1-cyclohexen-1-yl)-4-penten-1-one, and (+/−)-(2Z)-4,8-dimethyl-2,7-nonadien-4-ol.

In another preferred embodiment, the at least one perfuming ingredient imparting fresh odor note is a mixture of 10-undecenal, allyl (2-methylbutoxy)acetate and/or allyl (3-methylbutoxy)acetate, 2,6,-dimethyl-7-octen-2-ol, lavandin oil and (+-)-3,7-dimethyl-1,6- octadien-3-ol.

Preferably, 10-undecenal amounts to 7 to 20 wt. %, preferably 7 to 15 wt. %, preferably 10 to 15 wt. %, even more preferably 10 to 14 wt. % of the at least one perfuming ingredient imparting fresh odor note. In another embodiment, 10-undecenal amounts to 5 to 30 wt. %, preferably 10 to 20 wt. %, of the at least one perfuming ingredient imparting fresh odor note.

Preferably, allyl (2-methylbutoxy)acetate and/or allyl (3-methylbutoxy)acetate amount to 0.5 to 2 wt. %, preferably 1.0 to 1.8 wt. %, of the at least one perfuming ingredient imparting fresh odor note. In another embodiment, allyl (2-methylbutoxy)acetate and/or allyl (3-methylbutoxy)acetate amount to 1 to 20 wt. %, preferably 2 to 10 wt. %, of the at least one perfuming ingredient imparting fresh odor note.

Preferably, 2,6-dimethyl-7-octen-2-ol amounts to 30 to 60 wt. %, preferably 35 to 60 wt. %, preferably 50 to 60 wt. %, even more preferably 53 to 59 wt. %, of the at least one perfuming ingredient imparting fresh odor note. In another embodiment, 2,6-dimethyl-7-octen-2-ol amounts to 50 to 85 wt. %, preferably 70 to 80 wt. %, of the at least one perfuming ingredient imparting fresh odor note.

Preferably, 3,7-dimethyl-1,6-octadien-3-ol (linalool) amounts to 15 to 35 wt. %, preferably 16 to 35 wt. %, preferably 20 to 35 wt. %, even more preferably 24 to 32 wt. % of the at least one perfuming ingredient imparting fresh odor note.

Preferably, methyl 2-((1RS,2RS)-3-oxo-2-pentylcyclopentyl)acetate amounts to 10 to 30 wt. %, preferably 16 to 20 wt. %, of the at least one perfuming ingredient imparting fresh odor note.

15 Preferably, lavandin oil amounts to 1 to 20 wt. %, preferably 3 to 10 wt. %, of the at least one perfuming ingredient imparting fresh odor note.

Preferably, (+/−)-1-(5-ethyl-5-methyl-1-cyclohexen-1-yl)-4-penten-1-one amounts to 0.05 to 5 wt. %, preferably 0.1 to 2 wt. %, of the at least one perfuming ingredient imparting fresh odor note.

Preferably, (+/−)-(2Z)-4,8-dimethyl-2,7-nonadien-4-ol amounts to 1 to 20 wt. %, preferably 5 to 10 wt. %, of the at least one perfuming ingredient imparting fresh odor note.

In a particular embodiment, the at least one perfuming ingredient imparting floral odor note is selected from the group consisting of compound groups M, N, 0, P, Q, R, S, T, or any mixture thereof, wherein:

- perfuming ingredient of group M is selected from the group consisting of benzyl acetate, benzyl propionate, 4-phenyl-2-butanone, cyclohexyl acetate, 3-methyl-2-buten-1-yl acetate, (+-)-(3-methoxy-2-methylpropyl) benzene, methyl 2-((1RS,2RS)-3-oxo-2-pentylcyclopentyl)acetate, (−)-(2S)-1-oxo-1-(2-propanyloxy)-2-propanyl 2,2-dimethylpropanoate, 2-hexyl-3-phenyl-2-propenal, or any combination thereof;

perfuming ingredient of group N is selected from the group consisting of 3,7-dimethyl-6-octen-1-ol, 3-[(1R)-4-methyl-3-cyclohexen-1-yl]-1-butanol, 3-methyl-5-phenyl-1-pentanol, 3,7-dimethyl-2,6-ocradien-1-ol, 4-methyl-6-phenyl-2-hexanol, a mixture comprising (+/−)-4,7,9-trimethyldecan-2-ol and (+/−)-4,6,8-trimethyldecan-2-ol and (+/−)-2,4,6,8-tetramethylnonan-1-ol and (+/−)-3,8,9-trimethyldecan-2-ol and (+/−)-2,3,6,7-tetramethylnonan-1-ol, or any combination thereof;

perfuming ingredient of group 0 selected from the group consisting of (+/−)-(3E)-3-methyl-4-(2,6,6-trimethyl-2-cyclohexen-1-yl)-3-buten-2-one, (+/−)-(1E)-1-(2,6,6-trimethyl-2-cyclohexen-1-yl)-1-penten-3-one, (E)-3-methyl-4-(2,6,6-trimethyl-2-cyclohexen-1-yl)-3-buten-2-one, or any combination thereof;

perfuming ingredient of group P is selected from the group consisting of 3,7-dimethyl-1,6-octadien-3-ol, 3,7-dimethyl-1,6-nonadien-3-ol, 3,7-dimethyl-1-octen-3-ol, 3,7-dimethyl-3-octanol, 4-cyclohexyl-2-methyl-2-butanol, propyl 2-(tert-pentyloxy)propanoate, (2Z)-4,8-dimethyl-2,7-nonadien-4-ol, or any combination thereof;

perfuming ingredient of group Q is selected from the group consisting of methyl benzoate, ethyl benzoate, methyl cyclopentylideneacetate, or any combination thereof;

perfuming ingredient of group R is selected from the group consisting of 1-(2-naphthyl)ethanone, 1-(5,6,7,8-tetrahydro-2-naphthalenyl)ethanone, 2-methoxynaphthalene, methylanthranilate, or any combination thereof;

perfuming ingredient of group S is selected from the group consisting of 2-phenylethanol, 2-phenylethyl acetate, 3-methyl-5-phenyl-1-pentanol, cyclohexylidene(phenyl)acetonitrile, or any combination thereof;

perfuming ingredient of group T is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S,8S/R)-tricyclo[5.2.1.$0^{2,6}$]dec-3-en-8-yl 2-methylpropanoate, (1R/S,2R/S,6R/S,7R/S,8S/R)-tricyclo [5.2.1.$0^{2,6}$]dec-4-en-8-yl2-methylpropanoate, or any combination thereof.

Preferably, the at least one perfuming ingredient imparting floral odor note consists of a at least one perfuming ingredient of group T. Preferably the perfuming ingredient of group T is tricyclo[5.2.1.02,6]dec-3-en-8-yl acetate and/or tricyclo[5.2.1.02,6]dec-4-en-8-yl acetate.

Preferably, the at least one perfuming ingredient imparting floral odor note consists of at least one perfuming ingredient from each of compound groups M, N, 0, P, Q, R, S, and T. Preferably, the at least one perfuming ingredient imparting floral odor note consists of at least one perfuming ingredient from each of compound groups M, N, 0, P, R, S, and T.

Preferably, the at least one perfuming ingredient of compound group M is benzyl acetate and/or (+-)-(3-methoxy-2-methylpropyl)benzene and/or methyl 2-((1RS,2RS)-3-oxo-2-pentylcyclopentyl)acetate and/or (−)-(2S)-1-oxo-1-(2-propanyloxy)-2-propanyl 2,2-dimethylpropanoate. Preferably, the at least one perfuming ingredient of compound group N is 3,7-dimethyl-6-octen-1-ol. Preferably, the at least one perfuming ingredient of compound group 0 is (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one. Preferably, the at least one perfuming ingredient of compound group P is 3,7-dimethyl-1,6-octadien-3-ol (linalool). Preferably, the at least one perfuming ingredient of compound group Q is methyl benzoate. Preferably, the at least one perfuming ingredient of compound group R is 1-(2-naphthyl)ethenone. Preferably, the at least one perfuming ingredient of compound group S is 2-phenylethanol. Preferably, the at least one perfuming ingredient of compound group T is tricyclo[5.2.1.$0^{2,6}$]dec-3-en-8-yl acetate.

Preferably, the at least one perfuming ingredient imparting floral odor note is a mixture of benzyl acetate, 3,7-dimethyl-6-octen-1-ol, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, 3,7-dimethyl-1,6-octadien-3-ol (linalool), methyl benzoate, 1-(2-naphthyl)ethenone, 2-phenylethanol, and tricyclo [5.2.1.$0^{2,6}$]dec-3-en-8-yl acetate.

In a preferred embodiment, the at least one perfuming ingredient imparting floral odor note is a mixture of benzyl acetate, 3,7-dimethyl-6-octen-1-ol, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, methyl benzoate, 1-(2-naphthyl)ethenone, 2-phenylethanol, (+/−)-(3-methoxy-2-methylpropyl)benzene, methyl 2-((1RS,2RS)-3-oxo-2-pentylcyclopentyl)acetate, and (−)-(2S)-1-oxo-1-(2-propanyloxy)-2-propanyl 2,2-dimethylpropanoate.

In a preferred embodiment, the at least one perfuming ingredient imparting floral odor note is a mixture of methyl benzoate, benzyl acetate, 3,7-dimethyl-6-octen-1-ol, 2-hexyl-3-phenyl-2-propenal, (+/−)-(3E)-3-methyl-4-(2,6,6-tri methyl-2-cyclohexen-1-yl)-3-buten-2-one and (+/−)-(1E)-1-(2,6,6-trimethyl-2-cyclohexen-1-yl)-1-penten-3-one, 3,7-dimethyl-1,6-octadien-3-ol, 1-(2-naphthyl)ethenone, 2-phenylethanol, and (−)-(2S)-1-oxo-1-(2-propanyloxy)-2-propanyl 2,2-dimethylpropanoate.

Preferably, benzyl acetate amounts to 20 to 30 wt. %, preferably 21 to 28 wt. %, of the at least one perfuming ingredient imparting floral odor note. In another embodiment, benzyl acetate amounts to 10 to 30 wt. %, preferably 15 to 20 wt. %, of the at least one perfuming ingredient imparting floral odor note.

Preferably, 3,7-dimethyl-6-octen-1-ol amounts to 10 to 20 wt. %, preferably 12 to 18 wt. %, of the at least one perfuming ingredient imparting floral odor note.

Preferably, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one amount to 5 to 10 wt. %, preferably 6 to 9 wt. %, of the at least one perfuming ingredient imparting floral odor note.

Preferably, 3,7-dimethyl-1,6-octadien-3-ol (linalool) amounts to 5 to 15 wt. %, preferably 7 to 12 wt. %, of the at least one perfuming ingredient imparting floral odor note. In another embodiment, 3,7-dimethyl-1,6-octadien-3-ol amounts to 10 to 30 wt. %, preferably 15 to 20 wt. %, of the at least one perfuming ingredient imparting floral odor note.

Preferably, methyl benzoate amounts to 0.05 to 15 wt. % of the at least one perfuming ingredient imparting floral odor note, preferably 0.5 to 14 wt. %.

Preferably, 1-(2-naphthyl)ethenone amounts to 3 to 10 wt. %, preferably 4 to 8 wt. %, of the at least one perfuming ingredient imparting floral odor note.

Preferably, 2-phenylethanol amounts to 10 to 30 wt. %, preferably 16 to 30 wt. %, preferably to 30 wt. %, even more preferably 22 to 28 wt. %, of the at least one perfuming ingredient imparting floral odor note. In another embodiment, 2-phenylethanol amounts to 5 to 20 wt. %, preferably 10 to 15 wt. %, of the at least one perfuming ingredient imparting floral odor note.

Preferably, tricyclo[5.2.1.$0^{2,6}$]dec-3-en-8-yl acetate amounts to 2 to 5 wt. %, preferably 2.5 to 4.5 wt. %, of the at least one perfuming ingredient imparting floral odor note.

Preferably, (+-)-(3-methoxy-2-methylpropyl)benzene amounts to 2 to 5 wt. %, preferably 2.5 to 4.5 wt. %, of the at least one perfuming ingredient imparting floral odor note.

Preferably, methyl 2-((1RS,2RS)-3-oxo-2-pentylcyclopentyl)acetate amounts to 10 to 30 wt. %, preferably 15 to 20 wt. %, of the at least one perfuming ingredient imparting floral odor note.

Preferably, (−)-(2S)-1-oxo-1-(2-propanyloxy)-2-propanyl 2,2-dimethylpropanoate amounts to 1 to 20 wt. %, preferably 3 to 10 wt. %, of the at least one perfuming ingredient imparting floral odor note.

Preferably, (−)-(2S)-1-oxo-1-(2-propanyloxy)-2-propanyl 2,2-dimethylpropanoate amounts to 1 to 20 wt. %, preferably 3 to 10 wt. %, of the at least one perfuming ingredient imparting floral odor note.

Further examples of perfuming ingredients imparting floral odor note are: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino)benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2 E)-1-(2, 6,6-trimethyl-2-cyclohexen-1-yl)-2-buten-1-one, (2E)-1-[2,6,6-trimethyl-3-cyclohexen-1-yl]-2-buten-1-one, (2E)-1-(2,6, 6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1, 6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate , high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers.

In a particular embodiment, the at least one perfuming ingredient imparting green odor note is selected from the group consisting of 7-propyl-2H,4H-1,5-benzodioxepin-3-one, (+/−)-3-(4-isopropylphenyl)-2-methylpropanal, 3-(3,3/1,1-dimethyl-5-indanyl)propanal, (+/−)-(2,5-dimethyl-2,3-dihydro-1H-inden-2-yl)methanol, (4E)-4-methyl-5-(4-methylphenyl)-4-pentenal, (2Z)-2-phenyl-2-hexenenitrile, 3-(4,4-dimethyl-1-cyclohexen-1-yl)propanal, or any combination thereof.

Preferably, the at least one perfuming ingredient imparting green odor note is a mixture of 7-propyl-2H,4H-1,5-benzodioxepin-3-one, (+/−)-3-(4-isopropylphenyl)-2-methylpropanal, 3- (3,3/1,1-dimethyl-5-indanyl)propanal, (+/−)-(2,5-dimethyl-2,3-dihydro-1H-inden-2-yl)methanol, (4E)-4-methyl-5-(4-methylphenyl)-4-pentenal, (2Z)-2-phenyl-2-hexenenitrile, and 3-(4,4-dimethyl-1-cyclohexen-1-yl) propanal Preferably, 7-propyl-2H,4H-1,5-benzodioxepin-3-one amounts to 0.05 to 5 wt. %, preferably to 0.5 wt. %, of the at least one perfuming ingredient imparting green odor note.

Preferably, (+/−)-3-(4-isopropylphenyl)-2-methylpropanal amounts to 10 to 30 wt. %, preferably 15 to 20 wt. %, of the at least one perfuming ingredient imparting green odor note.

Preferably, 3-(3,3/1,1-dimethyl-5-indanyl)propanal amounts to 0.5 to 10 wt. %, preferably 1 to 5 wt. %, of the at least one perfuming ingredient imparting green odor note.

Preferably, (+/−)-(2,5-dimethyl-2,3-dihydro-1H-inden-2-yl)methanol amounts to 5 to 20 wt. %, preferably 10 to 15 wt. %, of the at least one perfuming ingredient imparting green odor note.

Preferably, (4E)-4-methyl-5-(4-methylphenyl)-4-pentenal amounts to 0.5 to 10 wt. %, preferably 1 to 5 wt. %, of the at least one perfuming ingredient imparting green odor note.

Preferably, (2Z)-2-phenyl-2-hexenenitrile amounts to 1 to 20 wt. %, preferably 3 to 10 wt. %, of the at least one perfuming ingredient imparting green odor note.

Preferably, 3-(4,4-dimethyl-1-cyclohexen-1-yl)propanal amounts to 0.5 to 10 wt. %, preferably 1 to 5 wt. %, of the at least one perfuming ingredient imparting green odor note.

As can be observed from the above, some perfuming ingredients do not only confer one of the above-mentioned odor notes (fruity, woody, fresh, floral, or green), but rather confer two or more odor notes at the same time. Therefore, such perfuming ingredients may be grouped not only in one of the above-mentioned alphabetical compound groups (A to T), but rather in two or more of the alphabetical compound groups.

In a particular embodiment, the perfuming composition comprises 10-undecenal, allyl (2-methylbutoxy)acetate and/or allyl (3-methylbutoxy)acetate, benzyl acetate, 5-heptyldihydro-35 2(3H)-furanone, tricyclo[5.2.1.$0^{2,6}$]dec-3-en-8-yl acetate, 4-(2-methyl-2-propanyl)cyclohexyl acetate, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, 3,7-dimethyl-1,6-octadien-3-ol, 2,6,-dimethyl-7-octen-2-ol, 3,7-dimethyl-6-octen-1-ol, methyl benzoate, 1-(2-naphthyl)ethenone, and 2-phenylethanol.

In a particular embodiment, the perfuming composition consists of 10-undecenal, allyl (2-methylbutoxy)acetate and/or allyl (3-methylbutoxy)acetate, benzyl acetate, 5-heptyldihydro-2(3H)-furanone, tricyclo[5.2.1.$0^{2,6}$]dec-3-en-8-yl acetate, 4-(2-methyl-2-propanyl)cyclohexyl acetate, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, 3,7-dimethyl-1,6-octadien-3-ol, 2,6,-dimethyl-7-octen-2-ol, 3,7-dimethyl-6-octen-1-ol, methyl benzoate, 1-(2-naphthyl)ethenone, and 2-phenylethanol.

Preferably, allyl (2-methylbutoxy)acetate and/or allyl (3-methylbutoxy)acetate amount to between 0.1 and 1.5 wt. % of the perfuming composition. Preferably, benzyl acetate amounts to between 5 and 15 wt. % of the perfuming composition. Preferably, 5-heptyldihydro-2(3H)-furanone amounts to between 5 and 10 wt. % of the perfuming composition. Preferably, tricyclo[5.2.1.$0^{2,6}$]dec-3-en-8-yl acetate amounts to between 5 and wt. % of the perfuming composition. Preferably, 4-(2-methyl-2-propanyl)cyclohexyl acetate amounts to between 5 and 10 wt. % of the perfuming composition. Preferably, (+/−)-(3E)-3-methyl-4-

(2,6,6-trimethyl-2-cyclohexen-1-yl)-3-buten-2-one and (+/−)-(1E)-1-(2,6,6-trimethyl-2-cyclohexen-1-yl)-1-penten-3-one amount to between 1 and 10 wt. % of the perfuming composition. Preferably, 3,7-dimethyl-1,6-octadien-3-ol amounts to between 10 and 20 wt. % of the perfuming composition. Preferably, 2,6-dimethyl-7-octen-2-ol amounts to between 10 and 20 wt. % of the perfuming composition. Preferably, 3,7-dimethyl-6-octen-1-01 amounts to between 3 and 10 wt. % of the perfuming composition. Preferably, methyl benzoate amounts to between 2 and 8 wt. % of the perfuming composition. Preferably, 1-(2-naphthyl)ethenone amounts to between 1 and 5 wt. % of the perfuming composition. Preferably, 2-phenylethanol amounts to between 5 and 15 wt. % of the perfuming composition.

In a particular embodiment, the perfuming composition comprises or consists of 10-undecenal, 7-propyl-2H,4H-1,5-benzodioxepin-3-one, allyl (2-methylbutoxy)acetate and/or allyl (3-methylbutoxy)acetate, benzyl acetate, (+/−)-(3-methoxy-2-methylpropyl)benzene, 3,7-dimethyl-6-octen-1-ol, patchouli oil, (+/−)-3-(4-isopropylphenyl)-2-methylpropanal, 2,6,-dimethyl-7-octen-2-ol, 4-(2-methyl-2-propanyl)cyclohexyl acetate, diethyl 1,4-cyclohexanedicarboxylate, methyl 2-((1RS,2RS)-3-oxo-2-pentylcyclopentyl)acetate, 3-(3,3/1,1-dimethyl-5-indanyl) propanal, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, lavandin oil, (+/−)-(2,5-dimethyl-2,3-dihydro-1H-inden-2-yl)methanol, (+/−)-3,7-dimethyl-1,6-octadien-3-ol, methyl benzoate, 1-(2-naphthyl)ethanone, (4E)-4-methyl-5-(4-methylphenyl)-4-pentenal, (+/−)-1-(5-ethyl-5-methyl-1-cyclohexen-1-yl)-4-penten-1-one, (+/−)-methyl 2-ethylhexanoate, 2-phenylethanol, 3-methyl-2-buten-1-yl acetate, (−)-(2S)-1-oxo-1-(2-propanyloxy)-2-propanyl 2,2-dimethylpropanoate, (2Z)-2-phenyl-2-hexenenitrile, (+/−)-(2Z)-4,8-dimethyl-2,7-nonadien-4-ol, 1-[(1RS,2RS)-1,2, 8, 8-tetramethyl-1,2, 3,4, 5,6, 7, 8-octahydro-2-naphthalenyl]ethanone, 14(2RS, 3RS)-2,3,8,8-tetramethyl-1,2,3,4,5,6,7,8-octahydronaphthalen-2-Aethanone, 1-[(2RS,3RS,8aRS)-2,3,8,8-tetramethyl-1,2,3,5,6,7,8,8a-octahydro-2-naphthalenyl]ethanone, 1-[(1RS,2RS,8aSR)-1,2,8,8-tetramethyl-1,2,3,5,6,7,8,8a-octahydro-2-naphthalenyl]ethanone, 3-(4,4-dimethyl-1-cyclohexen-1-yl)propanal, (+/−)-5-heptyldihydro-2(3H)-furanone, (+/−)-2,2,5-trimethyl-5-pentylcyclopentanone, and tricyclo[5.2.1.$0^{2,6}$]dec-3-en-8-yl acetate. In said embodiment, the compounds preferably show the following amounts based on the total perfuming composition:

- 10-undecenal: 1 to 10 wt. %, preferably from 2 to 5 wt. %;
- 7-propyl-2H,4H-1,5-benzodioxepin-3-one: 0.001 to 5 wt. %, preferably from 0.01 to 1 wt. %;
- allyl (2-methylbutoxy)acetate and/or allyl (3-methylbutoxy)acetate: 0.1 to 10 wt. %, preferably from 0.2 to 1 wt. %;
- benzyl acetate: 1 to 20 wt. %, preferably from 7 to 15 wt. %;
- (+/−)-(3-methoxy-2-methylpropyl)benzene: 0.1 to 10 wt. %, preferably from 0.5 to wt. %;
- 3,7-dimethyl-6-octen-1-ol: 1 to 20 wt. %, preferably from 2 to 5 wt. %;
- PATCHOULI oil: 0.1 to 10 wt. %, preferably from 0.5 to 5 wt. %;
- (+/−)-3-(4-isopropylphenyl)-2-methylpropanal: 0.1 to 10 wt. %, preferably from 0.5 to 5 wt. %;
- 2,6,-dimethyl-7-octen-2-ol: 1 to 10 wt. %, preferably from 2 to 8 wt. %;
- 4-(2-methyl-2-propanyl)cyclohexyl acetate: 1 to 10 wt. %, preferably from 2 to 8 wt. %;
- diethyl 1,4-cyclohexanedicarboxylate: 1 to 10 wt. %, preferably from 1.5 to 5 wt. %;
- methyl 2-((1RS,2RS)-3-oxo-2-pentylcyclopentyl)acetate: 1 to 20 wt. %, preferably from 5 to 12 wt. %;
- 3-(3,3/1,1-dimethyl-5-indanyl)propanal: 0.001 to 10 wt. %, preferably from 0.01 to 1 wt. %;
- (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one: 1 to 10 wt. %, preferably from 2 to 5 wt. %;
- LAVANDIN oil: 0.1 to 10 wt. %, preferably from 0.5 to 5 wt. %;
- (+/−)-(2, 5-dimethyl-2, 3-dihydro-1H-inden-2-yl) methanol: 0.1 to 10 wt. %, preferably from 0.5 to 5 wt. %;
- (+/−)-3,7-dimethyl-1,6-octadien-3-ol: 1 to 10 wt. %, preferably from 2 to 8 wt. %;
- methyl benzoate: 0.01 to 10 wt. %, preferably from 0.1 to 1 wt. %;
- 1-(2-naphthyl)ethanone: 1 to 10 wt. %, preferably from 2 to 5 wt. %;
- (4E)-4-methyl-5-(4-methylphenyl)-4-pentenal: 0.01 to 10 wt. %, preferably from to 1 wt. %;
- (+1+1-(5-ethyl-5-methyl-1-cyclohexen-1-yl)-4-penten-1-one: 0.001 to 10 wt. %, preferably from 0.01 to 1 wt. %;
- (+/−)-methyl 2-ethylhexanoate: 1 to 10 wt. %, preferably from 2 to 5 wt. %;
- 2-phenylethanol: 1 to 10 wt. %, preferably from 2 to 8 wt. %;
- 3-methyl-2-buten-1-yl acetate: 0.1 to 10 wt. %, preferably from 0.2 to 5 wt. %;
- (−)-(2S)-1-oxo-1-(2-propanyloxy)-2-propanyl 2,2-dimethylpropanoate: 0.1 to 10 wt. %, preferably from 1 to 5 wt. %;
- (2Z)-2-phenyl-2-hexenenitrile: 0.1 to 10 wt. %, preferably from 0.2 to 5 wt. %;
- (+/−)-(2Z)-4,8-dimethyl-2,7-nonadien-4-ol: 0.1 to 10 wt. %, preferably from 0.5 to wt. %;
- 1-[(1RS,2 RS)-1,2,8,8-tetramethyl-1,2, 3,4,5,6, 7,8-octahydro-2-naphthalenyl]ethanone, 14(2RS,3RS)-2,3,8,8-tetramethyl-1,2,3,4,5,6,7,8-octahydronaphthalen-2-yl) ethanone, 1-[(2RS,3RS,8aRS)-2,3,8,8-tetramethyl-1,2,3,5,6,7,8,8a-octahydro-2-naphthalenyl]ethanone, and 1-[(1RS,2RS,8aSR)-1,2,8,8-tetramethyl-1,2,3,5,6,7,8,8a-octahydro-2-naphthalenyl]ethanone: 0.1 to wt. %, preferably from 0.5 to 5 wt. %;
- 3-(4,4-dimethyl-1-cyclohexen-1-Apropanal: 0.001 to 10 wt. %, preferably from to 1 wt. %;
- (+/−)-5-heptyldihydro-2(3H)-furanone: 0.1 to 10 wt. %, preferably from 0.5 to 5 wt. %;
- (+/−)-2,2,5-trimethyl-5-pentylcyclopentanone: 0.1 to 10 wt. %, preferably from 1 to 5 wt. %;
- tricyclo[5.2.1.02,6]dec-3-en-8-yl acetate: 0.1 to 10 wt. %, preferably from 1 to 10 wt. %.

In a particular embodiment, the perfuming composition comprises or consists of 10-undecenal, allyl (2-methylbutoxy)acetate and/or allyl (3-methylbutoxy)acetate, benzyl acetate, cedarwood oil, 3,7-dimethyl-6-octen-1-ol, patchouli oil, 2,6-dimethyl-7-octen-2-ol, 4-(2-methyl-2-propanyl)cyclohexyl acetate, (+/−)-5-heptyldihydro-2(3H)-furanone, 2-hexyl-3-phenyl-2-propenal, methyl benzoate, (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one, lavandin oil, (+/−)-3,7-dimethyl-1,6-octadien-3-ol, 1-(2-naphthyl)ethenone, 2-phenylethanol, (−)-(2S)-1-oxo-1-(2-propanyloxy)-2-propanyl 2,2-dimethylpropanoate, 1-[(1RS,2RS)-1,2,8,8-tetramethyl-1,2,3,4,5,6,7,8-octahydro-2-naphthalenyl]ethanone, 1-((2RS,3RS)-2,3,8,8-tetramethyl-1,2,3,4,5,6,7,8-octahydronaphthalen-2-Aethanone, 1-[(2 RS, 3RS, 8aRS)-2, 3, 8, 8-tetramethyl-1,2 ,3, 5,6, 7,8, 8a-octahydro-2-naphthalenyl]ethanone, 1-[(1RS,2 RS, 8aSR)-1,2, 8, 8-tetramethyl-1,2 ,3, 5,6, 7,8, 8a-octahydro-2-naphthalenyl]ethenone, and tricyclo [5.2.1.0$^{2,6}$]dec-3-en-8-yl acetate. In said embodiment, the compounds preferably show the following amounts based on the total perfuming composition:

- 10-undecenal: 0.05 to 15 wt. %, preferably from 1 to 5 wt. %;
- allyl (2-methylbutoxy)acetate and/or allyl (3-methylbutoxy)acetate: 0.05 to 10 wt. %, preferably from 0.1 to 5 wt. %;
- methyl benzoate: 0.05 to 5 wt. %, preferably from 0.4 to 2 wt. %;
- benzyl acetate: 2 to 30 wt. %, preferably from 7 to 13 wt. %;
- cedarwood oil: 1 to 20 wt. %, preferably from 3 to 10 wt. %;
- 3,7-dimethyl-6-octen-1-ol: 1 to 20 wt. %, preferably from 3 to 10 wt. %;
- patchouli oil: 0.05 to 10 wt. %, preferably from 0.1 to 5 wt. %;
- 2,6-dimethyl-7-octen-2-ol: 2 to 30 wt. %, preferably from 10 to 15 wt. %;
- 4-(2-methyl-2-propanyl)cyclohexyl acetate: 1 to 20 wt. %, preferably from 3 to 10 wt. %;
- (+/−)-5-heptyldihydro-2(3H)-furanone: 1 to 20 wt. %, preferably from 3 to 10 wt. %;
- 2-hexyl-3-phenyl-2-propenal: 1 to 20 wt. %, preferably from 3 to 10 wt. %;
- (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one: 1 to 20 wt. %, preferably from 2 to 10 wt. %;
- lavandin oil: 0.05 to 10 wt. %, preferably from 0.5 to 5 wt. %;
- (+/−)-3,7-dimethyl-1,6-octadien-3-ol: 1 to 25 wt. %, preferably from 7 to 13 wt. %;
- 1-(2-naphthyl)ethenone: 0.5 to 10 wt. %, preferably from 1 to 5 wt. %;
- 2-phenylethanol: 1 to 20 wt. %, preferably from 5 to 10 wt. %;
- (−)-(2S)-1-oxo-1-(2-propanyloxy)-2-propanyl 2,2-dimethylpropanoate: 0.5 to 10 wt. %, preferably from 1 to 5 wt. %;
- 1-[(1RS,2 RS)-1,2,8,8-tetramethyl-1,2, 3,4,5,6, 7,8-octahydro-2-naphthalenyl]ethanone, 14(2RS,3RS)-2,3,8,8-tetramethyl-1,2,3,4,5,6,7,8-octahydronaphthalen-2-yl) ethanone, 1-[(2RS,3RS,8aRS)-2,3,8,8-tetramethyl-1,2,3,5,6,7,8,8a-octahydro-2-naphthalenyl]ethanone, and 1-[(1RS,2RS,8aSR)-1,2,8,8-tetramethyl-1,2,3,5,6,7,8,8a-octahydro-2-naphthalenyl]ethenone: 0.5 to 10 wt. %, preferably from 1 to 5 wt. %;
- tricyclo[5.2.1.0$^{2,6}$]dec-3-en-8-yl acetate: 1 to 15 wt. %, preferably from 5 to 10 wt. %.

10 In a particular embodiment, the at least one pro-perfume compound is added in an olfactory effective amount, preferably in an amount of from 0.1 to 80 wt. %, more preferably from 0.25 to 60 wt. %, even more preferably from 0.5 to 40 wt. %, even more preferably from 1.0 to 20 wt. %, and even more preferably from 1.5 to 19 wt. %, based on the total weight of the perfuming composition.

Another aspect of the invention concerns the use of at least one pro-perfume compound as defined above to confer, improve, enhance or modify the freshness of a perfuming composition as defined above or a perfumed consumer product.

Another aspect of the invention concerns the use of at least one pro-perfume compound as defined above to confer, improve, enhance or modify the fragrance intensity of a perfuming composition as defined above or a perfumed consumer product.

The present invention further relates to a perfumed composition comprising

- at least one pro-perfume compound according to formula (I) as defined above;
- at least one perfuming ingredient, preferably imparting a fruity and/or woody and/or fresh and/or floral and/or green odor note, as defined above;
- optionally at least one ingredient selected from the group consisting of a perfumery carrier and one or more perfuming co-ingredient, and
- optionally, at least one perfumery adjuvant.

In a particular embodiment, the perfumed composition comprises one pro-perfume compound. In another particular embodiment, the perfumed composition comprises two pro-perfume compounds. In yet another particular embodiment, the perfumed composition comprises three pro-perfume compounds.

In a particular embodiment, the at least one pro-perfume compound is present in the perfumed composition in an effective amount to confer, improve, enhance or modify the freshness of the at least one perfuming ingredient.

In a particular embodiment, the at least one pro-perfume compound is present in an amount of at least 0.05 wt. %, preferably at least 0.1 wt. %, more preferably at least 1 wt. % and even more preferably at least 2 wt. %, based on the total weight of the perfumed composition. In a particular embodiment, the at least one pro-perfume compound is present in an amount of not more than 30 wt. %, preferably not more than 20 wt. %, more preferably not more than wt. %, even more preferably not more than 10 wt. %, based on the total weight of the perfumed composition.

In a particular embodiment, the at least one pro-perfume compound is present in an amount from 0.05 to 30 wt. %, preferably in an amount from 0.1 to 20 wt. %, more preferably in an amount from 1 to 15 wt. %, even more preferably in an amount from 2 to 10 wt. %, based on the total weight of the perfumed composition.

In a particular embodiment, the perfumed composition comprises at least one perfuming ingredient, preferably imparting a fruity and/or woody and/or fresh and/or floral and/or green odor note.

In a particular embodiment, the at least one perfuming ingredient, preferably imparting a fruity and/or woody and/or fresh and/or floral and/or green odor note, is present in an amount of from 0.1 to 80 wt. %, more preferably from 1 to 60 wt. %, even more preferably from 2.5 to 40 wt. %, even more preferably from 5 to 20 wt. %, and even more preferably from 7 to 14 wt. %, based on the total weight of the perfumed composition.

In another particular embodiment, the at least one perfuming ingredient, preferably imparting a fruity and/or woody and/or fresh and/or floral and/or green odor note, is present in an amount of from 2 to 14 wt. %, based on the total weight of the perfumed composition.

In a particular embodiment, the weight ratio of the at least one perfuming ingredient, preferably imparting a fruity and/or woody and/or fresh and/or floral and/or green odor note, to the at least one pro-perfume in the perfumed composition is from 100:1 to 1:100. Preferably, the weight ratio of the at least one perfuming ingredient to the at least one pro-perfume in the perfumed composition is from 75:1 to 1:1, more preferably from 50:1 to 5:1.

In a particular embodiment, the pH value of the perfumed composition is between 2 and 12 at ambient temperature (20° C.). Preferably, the pH value is between 7 and 11, even more preferably between 9 and 11.

In a particular embodiment, the perfumed composition is encapsulated. The perfumed composition can be encapsulated in a microcapsule. Preferably, the perfumed composition is encapsulated in a core-shell microcapsule wherein the perfumed composition is contained in the core surrounded by the shell. The shell of the microcapsule protects the perfumed composition from the environment. The shell is made of material, which is able to release the perfumed composition. Preferably, the shell is made of material, which is able to release the perfumed composition upon breakage of the shell and/or by diffusion through the shell. A person skilled in the art is well aware of processes to prepare said microcapsules.

In another particular embodiment, not the entire perfumed composition is encapsulated, but only the at least one pro-perfume compound and/or the at least one perfuming ingredient.

The nature of the shell can vary. According to a particular embodiment, the shell of the microcapsule comprises a material selected from the group consisting of polyurea, polyurethane, polyamide, polyester, poly(meth)acrylate (i.e. polyacrylate and/or polymethacrylate), polysiloxane, polycarbonate, polysulfonamide, polymers of urea and formaldehyde, melamine and formaldehyde, melamine and urea, or melamine and glyoxal and mixtures thereof. The shell can also be hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to a particular embodiment, the core-shell microcapsule(s) can be also prepared by using different encapsulation methods.

In a preferred embodiment, the shell of the microcapsules may be, each independently, selected from the group of aminoplast, polyamide, polyester, polyurea and polyurethane shells and mixtures thereof.

In a particular embodiment, the shell of the microcapsules comprises an aminoplast copolymer, such as melamine-formaldehyde or urea-formaldehyde or cross-linked melamine formaldehyde or melamine glyoxal.

In a particular embodiment, the shell of the microcapsules is polyurea-based made from, for example but not limited to isocyanate-based monomers and amine-containing cross-linkers such as guanidine carbonate and/or guanazole. Certain polyurea microcapsules comprise a polyurea wall which is the reaction product of the polymerisation between at least one polyisocyanate comprising at least two isocyanate functional groups and at least one reactant selected from the group consisting of an amine (for example a water-soluble guanidine salt and guanidine); a colloidal stabilizer or emulsifier; and an encapsulated perfume. However, the use of an amine can be omitted.

In a particular embodiment, the colloidal stabilizer includes an aqueous solution of between and 0.4% of polyvinyl alcohol, between 0.6% and 1% of a cationic copolymer of vinylpyrrolidone and of a quaternized vinylimidazol (all percentages being defined by weight relative to the total weight of the colloidal stabilizer). In a particular embodiment, the emulsifier is an anionic or amphiphilic biopolymer, which may be for example chosen from the group consisting of gum Arabic, soy protein, gelatin, sodium caseinate and mixtures thereof.

In a particular embodiment, the shell of the microcapsules is polyurethane-based made from, for example but not limited to polyisocyanate and polyols, polyamide, polyester, etc. In a particular embodiment, the microcapsules have a polymeric shell resulting from complex coacervation wherein the shell is possibly cross-linked.

In a particular embodiment of the core-shell microcapsules, the core-shell microcapsules comprise an oil-based core comprising a hydrophobic active, preferably at least one compound of formula(I), and a composite shell comprising a first material and a second material, wherein the first material and the second material are different, the first material is a coacervate, the second material is a polymeric material.

In a particular embodiment, the weight ratio between the first material and the second material is comprised between 50:50 and 99.9:0.1.

In a particular embodiment, the coacervate comprises a first polyelectrolyte, preferably selected among proteins (such as gelatin), polypeptides or polysaccharides (such as chitosan), most preferably Gelatin and a second polyelectrolyte, preferably alginate salts, cellulose derivatives guar gum, pectinate salts, carrageenan, polyacrylic and methacrylic acid or xanthan gum, or yet plant gums such as acacia gum (Gum Arabic), most preferably Gum Arabic.

The coacervate first material can be hardened chemically using a suitable cross-linker such as glutaraldehyde, glyoxal, formaldehyde, tannic acid or genipin or can be hardened enzymatically using an enzyme such as transglutaminase.

The second polymeric material can be selected from the group consisting of polyurea, polyurethane, polyamide, polyester, polyacrylate, polysiloxane, polycarbonate, polysulfonamide, polymers of urea and formaldehyde, melamine and formaldehyde, melamine and urea, or melamine and glyoxal and mixtures thereof, preferably polyurea 10 and/or polyurethane. The second material is preferably present in an amount less than 3 wt. %, preferably less than 1 wt. % based on the total weight of the microcapsule slurry.

The preparation of an aqueous dispersion/slurry of core-shell microcapsules is well known by a skilled person in the art. In a particular embodiment, the microcapsule wall material may comprise any suitable resin and especially including melamine, glyoxal, polyurea, polyurethane, polyamide, polyester, etc. Suitable resins include the reaction product of an aldehyde and an amine, suitable aldehydes include, formaldehyde and glyoxal. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof. Suitable materials for making may be obtained from one or more of the following companies Solutia Inc. (St Louis, Missouri U.S.A.), Cytec Industries (West Paterson, New Jersey U.S.A.), Sigma-Aldrich (St. Louis, Missouri U.S.A.).

In a particular embodiment of the core-shell microcapsules, the core-shell microcapsules comprises an oil-based core comprising a hydrophobic active, preferably comprising the perfumed composition comprising at least one compound of formula (I), optionally an inner shell made of a polymerized polyfunctional monomer;

a biopolymer shell comprising a protein, wherein at least one protein is cross-linked.

According to a particular embodiment, the protein is chosen in the group consisting of milk proteins, caseinate salts such as sodium caseinate or calcium caseinate, casein, whey protein, hydrolyzed proteins, gelatins, gluten, pea protein, soy protein, silk protein and mixtures thereof, preferably sodium caseinate.

According to a particular embodiment, the protein comprises sodium caseinate and a globular protein, preferably chosen in the group consisting of whey protein, beta-lactoglobulin, ovalbumine, bovine serum albumin, vegetable proteins, and mixtures thereof. The protein is preferably a mixture of sodium caseinate and whey protein.

According to a particular embodiment, the biopolymer shell comprises a crosslinked protein chosen in the group consisting of sodium caseinate and/or whey protein.

According to a particular embodiment, the microcapsules slurry comprises at least one microcapsule made of:

an oil-based core comprising the hydrophobic active, preferably comprising the perfumed composition comprising at least one compound of formula (I);

an inner shell made of a polymerized polyfunctional monomer; preferably a polyisocyanate having at least two isocyanate functional groups a biopolymer shell comprising a protein, wherein at least one protein is cross-linked;

wherein the protein contains preferably a mixture comprising sodium caseinate and a globular protein, preferably whey protein.

optionally at least an outer mineral layer.

According to an embodiment, sodium caseinate and/or whey protein is (are) cross-linked protein(s).

The weight ratio between sodium caseinate and whey protein is preferably comprised between 0.01 and 100, preferably between 0.1 and 10, more preferably between 0.2 and 5.

In a particular embodiment, the microcapsules is a one-shell aminoplast core-shell microcapsule obtainable by a process comprising the steps of:

1) admixing a perfumed composition with at least a polyisocyanate having at least two isocyanate functional groups to form an oil phase;
2) dispersing or dissolving into water an aminoplast resin and optionally a stabilizer to form a water phase;
3) preparing an oil-in-water dispersion, wherein the mean droplet size is comprised between 1 and 100 microns, by admixing the oil phase and the water phase;
4) performing a curing step to form the wall of said microcapsule; and
5) optionally drying the final dispersion to obtain the dried core-shell microcapsule.

In a particular embodiment, the core-shell microcapsule is a formaldehyde-free capsule. A typical process for the preparation of aminoplast formaldehyde-free microcapsules slurry comprises the steps of 1) preparing an oligomeric composition comprising the reaction product of, or obtainable by reacting together:
   a. a polyamine component in the form of melamine or of a mixture of melamine and at least one $C_1$-$C_4$ compound comprising two $NH_2$ functional groups;
   b. an aldehyde component in the form of a mixture of glyoxal, a $C_{1-4}$ 2,2-dialkoxy-ethanal and optionally a glyoxalate, said mixture having a molar ratio glyoxal/$C_{1-4}$ 2,2-dialkoxy-ethanal comprised between 1/1 and10/1; and
   c. a protic acid catalyst;
2) preparing an oil-in-water dispersion, wherein the droplet size is comprised between 1 and 600 microns, and comprising:
   a. an oil;
   b. a water medium:
   c. at least an oligomeric composition as obtained in step 1;
   d. at least a cross-linker selected amongst:
      i. $C_1$-$C_{12}$ aromatic or aliphatic di- or tri-isocyanates and their biurets, triurets, trimmers, trimethylol propane-adduct and mixtures thereof; and/or
      ii. a di- or tri-oxiran compounds of formula:

Q-(oxiran-2-ylmethyl)$_n$ wherein n stands for 2 or 3 and Q represents a $C_2$-$C_6$ group optionally comprising from 2 to 6 nitrogen and/or oxygen atoms;

e. optionally a $C_1$ -$C_4$ compounds comprising two $NH_2$ functional groups;

3) Heating the dispersion; and
4) Cooling the dispersion.

The above process is described in more details in WO 2013/068255.

In a particular embodiment of the core-shell microcapsules, the core-shell microcapsule is a polyamide core-shell polyamide microcapsule comprising:

an oil based core comprising comprising an hydrophobic active, preferably comprising at least one compound of formula (I), and a polyamide shell comprising or being obtainable from:
   an acyl chloride,
   a first amino compound, and
   a second amino compound.

According to a particular embodiment, the polyamide core-shell microcapsule comprises:

an oil based core comprising an hydrophobic active, preferably comprising at least one compound of formula (I), and a polyamide shell comprising or being obtainable from:
   an acyl chloride, preferably in an amount comprised between 5 and 98%, preferably between 20 and 98%, more preferably between 30 and 85% w/w
   a first amino compound , preferably in an amount comprised between 1% and 50% w/w, preferably between 7 and 40% w/w;
   a second amino compound, preferably in an amount comprised between 1% and 50% w/w, preferably between 2 and 25% w/w
   a stabilizer, preferably a biopolymer, preferably in an amount comprised between 0 and 90%, preferably between 0.1 and 75%, more preferably between 1 and 70%.

According to a particular embodiment, the polyamide core-shell microcapsule comprises:

an oil based core comprising a hydrophobic active, preferably comprising the perfumed composition comprising at least one compound of formula (I), and a polyamide shell comprising or being obtainable from:
   an acyl chloride,
   a first amino-compound being an amino-acid, preferably chosen in the group consisting of L-Lysine, L-Arginine, L-Histidine, L-Tryptophane and/or mixture thereof.

a second amino.compound chosen in the group consisting of ethylene diamine, diethylene triamine, cystamine and/or mixture thereof, and a biopolymer chosen in the group consisting of casein, sodium caseinate, bovin serum albumin, whey protein, and/or mixture thereof.

The first amino-compound can be different from the second amino-compound.

Typically, a process for preparing a polyamide-based micrcoapsule includes the following steps:

a) Dissolving at least one acyl chloride in a hydrophobic material, preferably a perfume to form an oil phase;
b) Dispersing the oil phase obtained in step a) into a water phase comprising a first amino compound to form an oil-in water emulsion;
c) Performing a curing step to form polyamide microcapsules in the form of a slurry;

wherein a stabilizer is added in the oil phase and/or in the water phase, and wherein at least a second amino-compound is added in the water phase before the formation of the oil-in-water emulsion and/or in the oil-in water emulsion obtained after step b).

In a particular embodiment, the shell of the microcapsule is polyurea-or polyurethane-based. Examples of processes for the preparation of polyurea and polyureathane-based microcapsule slurry are for instance described in WO 2007/004166, EP 2300146, and EP 2579976. Typically, a process for the preparation of polyurea or polyurethane-based microcapsule slurry include the following steps:

a) Dissolving at least one polyisocyanate having at least two isocyanate groups in an oil to form an oil phase;
b) Preparing an aqueous solution of an emulsifier or colloidal stabilizer to form a water phase;
c) Adding the oil phase to the water phase to form an oil-in-water dispersion, wherein the mean droplet size is comprised between 1 and 500 μm, preferably between 5 and 50 μm; and
d) Applying conditions sufficient to induce interfacial polymerisation and form microcapsules in form of a slurry.

In a particular embodiment, the microcapsule can be in form of a powder, which in particular may be obtained by submitting the microcapsule slurry to a drying, like spray-drying, to provide the microcapsules as such, i.e. in a powdery form. It is understood that any standard method known by a person skilled in the art to perform such drying is also applicable. In particular the slurry may be spray-dried preferably in the presence of a polymeric carrier material such as polyvinyl acetate, polyvinyl alcohol, dextrins, natural or modified starch, gum Arabic, vegetable gums, pectins, xanthans, alginates, carrageenans or cellulose derivatives to provide microcapsules in a powder form.

However, one may cite also other drying method such as the extrusion, plating, spray granulation, the fluidized bed, or even a drying at room temperature using materials (carrier, desiccant) that meet specific criteria as disclosed in WO 2017/134179.

In a particular embodiment, the perfumed composition according to the invention comprises a perfumery carrier.

By "perfumery carrier" it is meant here a material which is practically neutral from a perfumery point of view, i.e. that does not significantly alter the organoleptic properties of perfuming ingredients. Said carrier may be a liquid or a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples, solvents such as butylene or propylene glycol, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. Other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company), or hydrogenated castors oils such as those known under the trademark Cremophor® RH 40 (origin: BASF). Preferably, the liquid carrier is triethyl citrate or dipropylene glycol.

Solid carrier is meant to designate a material to which the perfumed composition or some element of the perfumed composition can be chemically or physically bound. In general, such solid carriers are employed either to stabilize the composition, or to control the rate of evaporation of the compositions or of some ingredients. The use of solid carrier is of current use in the art and a person skilled in the art knows how to reach the desired effect. However, by way of non-limiting example of solid carriers, one may cite absorbing gums or polymers or inorganic material, such as porous polymers, cyclodextrins, wood based materials, organic or inorganic gels, clays, gypsum talc or zeolites.

As other non-limiting examples of solid carriers, one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs- and Geliermittel in Lebensmitteln, Band 2 der Schriftenreihe Lebensmittelchemie, Lebensmittelqualität, Behr's Verlag GmbH & Co., Hamburg, 1996. The encapsulation is a well-known process to a person skilled in the art, and may be performed, for instance, by using techniques such as spray-drying, agglomeration or yet extrusion; or consists of a coating encapsulation, including coacervation and complex coacervation technique.

As non-limiting examples of solid carriers, one may cite in particular the core-shell capsules with resins of aminoplast, polyamide, polyester, polyurea or polyurethane type or a mixture thereof (all of said resins are well known to a person skilled in the art) using techniques like phase separation process induced by polymerization, interfacial polymerization, coacervation or altogether (all of said techniques have been described in the prior art), optionally in the presence of a polymeric stabilizer or of a cationic copolymer.

Resins may be produced by the polycondensation of an aldehyde (e.g. formaldehyde, 2,2-dimethoxyethanal, glyoxal, glyoxylic acid or glycolaldehyde and mixtures thereof) with an amine such as urea, benzoguanamine, glycoluryl, melamine, methylol melamine, methylated methylol melamine, guanazole and the like, as well as mixtures thereof. Alternatively, one may use preformed resins alkylolated polyamines such as those commercially available under the trademark Urac® (origin: Cytec Technology Corp.), Cy mel® (origin: Cytec Technology Corp.), Urecoll® or Luracoll® (origin: BASF).

Others resins one are the ones produced by the polycondensation of an a polyol, like glycerol, and a polyisocyanate, like a trimer of hexamethylene diisocyanate, a trimer of isophorone diisocyanate or xylene diisocyanate or a Biuret of hexamethylene diisocyanate or a trimer of xylene diisocyanate with trimethylolpropane (known with the tradename of Takenate® , origin: Mitsui Chemicals), among which a trimer of xylene diisocyanate with trimethylolpropane and a Biuret of hexamethylene diisocyanate.

Some of the seminal literature related to the encapsulation of perfumes by polycondensation of amino resins, namely melamine based resins with aldehydes includes represented by articles such as those published by K. Dietrich et al. Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited, is a pertinent early example of the latter. Since then, many other authors have enriched the literature in this field and it would be impossible to cover all published developments here, but the general knowledge in encapsulation technology is very significant. More recent publications of pertinence, which disclose suitable uses of such microcapsules, are represented for example by the article of K. Bruyninckx and M. Dusselier, ACS Sustainable Chemistry & Engineering, 2019, vol. 7, pages 8041-8054.

In a particular embodiment, the perfumed composition according to the invention comprises a perfuming co-ingredient.

The perfuming co-ingredient is not a compound according to the invention, i.e. not a pro-perfume compound and not a perfuming ingredient as defined above. Moreover, the term "perfuming co-ingredient" is understood as a compound, which is used in a perfumed preparation or composition to impart a hedonic effect. In other words, such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present in the base do not warrant a more detailed description here, which in any case would not be exhaustive, the skilled person being able to select them on the basis of general knowledge and according to intended use or application and the desired organoleptic effect. In general terms, these perfuming co-ingredients belong to chemical classes as varied as alcohols, lactones, aldehydes, ketones, esters, ethers, acetates, nitriles, terpene hydrocarbons, nitrogenous or sulphurous heterocyclic compounds and essential oils, and the perfuming co-ingredients can be of natural or synthetic origin. In particular, one may cite perfuming co-ingredients which are commonly used in perfume formulations, such as:

- Aromatic-herbal ingredients: eucalyptus oil, camphor, eucalyptol, 5-methyltricyclo[$6.2.1.0^{2,7}$]undecan-4-one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;
- Balsamic ingredients: coumarin, ethylvanillin and/or vanillin;
- Citrus ingredients: dihydromyrcenol, orange oil, linalyl acetate, citronellyl nitrile, orange terpenes, limonene, 1-p-menthen-8-yl acetate and/or 1,4(8)-p-menthadiene;
- Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;
- Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S)-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)4-[1-(3',3'-dimethyl-1'-cyclohexyl)ethoxycarbonyl]methyl propanoate,;
- Other ingredients (e.g. amber, powdery spicy or watery): dodecahydro-3a,6,6,9a-tetramethyl-naphtho[2,1-b]furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

A perfumed composition according to the invention may not be limited to the above-mentioned perfuming co-ingredients, and many other of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds also known as properfume or profragrance. Non-limiting examples of suitable properfume may 2-phenylethyl oxo(phenyl)acetate, 3,7-dimethylocta-2,6-dien-1-yl oxo(phenyl)acetate, (Z)-hex-3-en-1-yl oxo(phenyl)acetate, 3,7-dimethyl-2,6-octadien-1-yl hexadecanoate, bis(3,7-dimethylocta-2,6-dien-1-yl) succinate, (2-((2-methylundec-1-en-1-yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl)oxy)-2-methylundec-1-ene, (2-((2-methylundec- 1-en-1-yl)oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene(2-((2-pentylcyclopentylidene)methoxy)ethyl)benzene or a mixture thereof.

In a particular embodiment, the perfumed composition according to the invention comprises at least one perfumery adjuvant.

The term "perfumery adjuvant" is understood as an ingredient capable of imparting additional added benefit such as a color, a particular light resistance, chemical stability and etc. A detailed description of the nature and type of adjuvant commonly used in perfuming bases cannot be exhaustive, but it has to be mentioned that the ingredients are well known to a person skilled in the art. However, one may cite as specific non-limiting examples the following: viscosity agents (e.g. surfactants, thickeners, gelling and/or rheology modifiers), stabilizing agents (e.g. preservatives, antioxidants, heat/light and or buffers or chelating agents, such as BHT), coloring agents (e.g. dyes and/or pigments), preservatives (e.g. antibacterial or antimicrobial or antifungal or anti-irritant agents), abrasives, skin cooling agents, fixatives, insect repellants, ointments, vitamins and mixture thereof.

Other suitable perfumery adjuvants optionally used in combination with the perfuming composition according to the present invention comprise amine such as monoethanolamine or tertiary amines, in particular those with high water solubility, such as triethanolamine, triethylamine, methyldiethanolamine, dimethylethanolamine, 1,1',1",1'"-[1,2-ethanediyldi(nitrilo)]tetra(2-propanol), alkyldiethanolamines and ethoxylated alkyldiethanolamines.

A particular aspect of the invention's perfumery compositions concerns the ones further comprising (in addition to the above-mentioned compositions) at least one compound selected amongst the isothiazolones of formula

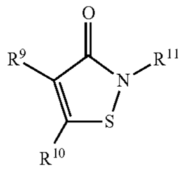

(IV)

wherein $R^9$ and $R^{10}$ represent, separately and independently of each other, a hydrogen atom, a halogen atom, preferably chlorine, a $C_1$-$C_4$ linear or branched alkyl group, an amino group or a benzylamino group; or, alternatively, $R^4$ and $R^5$ are taken together to represent a phenyl or pyridine ring, possibly substituted with one to four $C_1$ -$C_4$ linear or branched alkyl or alkenyl groups and/or one to two halogen atoms, preferably chlorine atoms; and $R^{11}$ represents a hydrogen atom, an alkali metal atom, in particular Na or K, a phenyl or benzyl group possibly substituted with one or two halogen atoms and/or one or two methyl, trifluoromethyl, methoxy or amino groups, an amine group, or a $C_1$-$C_8$ unsaturated, linear, branched or cyclic hydrocarbon group possibly substituted with one or two nitrogen, oxygen or halogen atoms.

According to a particular embodiment of the invention said compound of formula (IV) is one wherein $R^9$ and $R^{10}$ represent, separately and independently of each other, a hydrogen atom, a chlorine atom or a methyl group or, alternatively, $R^9$ and $R^{10}$ are taken together to represent a phenyl ring, and $R^{11}$ represents a hydrogen atom or a methyl group.

According to a particular embodiment of the invention, said compound of formula (IV) is selected from the group of isothiazolones consisting of 1,2-benzisothiazol-3(2H)-one, 4- or or 2-methylisothiazol-3(2H)-one, or more preferably 5-chloro-2-methylisothiazol-3(2H)-one or 1,2-benzisothiazol-3(2H)-one, and most preferably 1,2-benzisothiazol-3 (2H)-one.

According to a particular embodiment of the invention, said compound of formula (IV) is present in the compositions of the invention at a weight concentration of 0.0% to 5%, relative to the total weight of the composition. According to more preferred embodiments of the invention, the concentration of compound of formula (IV) is comprised between 0.001 and 3% of the total weight, preferably between 0.005 and 0.1%.

It is understood that a person skilled in the art is perfectly able to design optimal formulations for the desired effect by admixing the above-mentioned components of a perfumed composition, simply by applying the standard knowledge of the art as well as by trial and error methodologies.

In a particular embodiment, the perfumed composition consists of at least one pro-perfume compound according to formula (I) as defined above;

at least one perfuming ingredient as defined above;

at least one ingredient selected from the group consisting of a perfumery carrier and one or more perfuming co-ingredient, and optionally, at least one perfumery adjuvant.

The invention's composition can also be advantageously used in all the fields of modern perfumery, i.e. fine or functional perfumery, to positively impart or modify the odor of a consumer product into which said composition is added. Consequently, another aspect of the invention concerns a perfumed consumer product comprising the perfumed composition according to the invention.

For the sake of clarity, it has to be mentioned that, the term "perfumed consumer product" is understood as a consumer product, which is expected to deliver at least a pleasant perfuming effect to the surface to which it is applied (e.g. skin, hair, textile, or hard surface). In other words, a perfumed consumer product according to the invention is a perfumed consumer product, which comprises the inventive perfumed composition, as well as optionally additional benefit agents, corresponding to the desired consumer product, e.g. a conditioner, a detergent or an air freshener, and an olfactorily effective amount of the perfuming composition according to the invention. For the sake of clarity, the perfumed consumer product is a non-edible product.

The nature and type of the constituents of the perfumed consumer product do not warrant a more detailed description here, which in any case would not be exhaustive, the skilled person being able to select them on the basis of his general knowledge and according to the nature and the desired effect of the product.

Non-limiting examples of suitable perfumed consumer products include a perfume, such as a fine perfume, a splash or eau de parfum, a cologne or a shave or after-shave lotion; a fabric care product, such as a liquid or solid or pods detergent, a fabric softener, a liquid or solid scent booster, a dryer sheet, a fabric refresher, an ironing water, a paper, a bleach, a carpet cleaner, a curtain—care product; a body-care product, such as a hair care product (e.g. a shampoo, a coloring preparation or a hair spray, a color—care product, a hair shaping product, a dental care product), a disinfectant, an intimate care product; a cosmetic preparation (e.g. a skin cream or lotion, a vanishing cream or a deodorant or antiperspirant (e.g. a spray or roll on), a hair remover, a tanning or sun or after sun product, a nail product, a skin cleansing, a makeup); or a skin-care product (e.g. a soap, a shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, a furniture care product, a wipe, a dish detergent or a hard-surface (e.g. a floor, bath, sanitary or a window-cleaning) detergent; a leather care product; a car care product, such as a polish, a wax or a plastic cleaner.

Typical examples of fabric detergents or softener compositions into which the perfumed composition of the invention can be incorporated are described in WO 97/34986 or in U.S. Pat. Nos. 4,137,180 and 5,236,615 or EP 799 885. Other typical detergent and softening compositions which can be used are described in works such as Ullmann's Encyclopedia of Industrial Chemistry, Vol. 20, Wiley-VCH, Weinheim, p. 355-540 (2012); Flick, Advanced Cleaning Product Formulations, Noye Publication, Park Ridge, New Jersey (1989); Showell, in Surfactant Science Series, vol. 71: Powdered Detergents, Marcel Dekker, New York (1988); Proceedings of the World Conference on Detergents (4th, 1998, Montreux, Switzerland), AOCS print.

The proportions in which the perfumed composition according to the invention can be incorporated into the various aforementioned articles or compositions vary within a wide range of values. These values are dependent upon the nature of the article or product to be perfumed.

In a particular embodiment, the perfumed consumer product comprises the perfumed composition in an amount of from 0.1 to 10 wt. %, preferably of from 0.2 to 5 wt. %, more preferably from 0.3 to 4 wt. %, even more preferably from 0.4 to 2 wt. % based on the total weight of the perfumed consumer product.

In a particular embodiment, the perfumed consumer product comprises the at least one pro-perfume compound in an amount of from 0.001 to 10 wt. %, preferably of from 0.05 to 5 wt. %, more preferably from 0. 1 to 2.5 wt. %, more preferably from 0. 15 to 1.5 wt. %, based on the total weight of the perfumed consumer product.

In a particular embodiment, the perfumed consumer product is a perfume, a fabric care product, a body-care product, a cosmetic preparation, a skin-care product, an air care product or a home care product. Preferably, the perfumed consumer product is a fabric softener.

In a particular embodiment, the perfumed consumer product is a fine perfume, a splash or eau de perfume, a cologne, a shave or after-shave lotion, a liquid or solid detergent, a fabric softener, a fabric refresher, an ironing water, a paper, a bleach, a carpet cleaners, curtain-care products, a shampoo, a coloring preparation, a color care product, a hair shaping product, a dental care product, a disinfectant, an intimate care product, a hair spray, a hair conditioning product, a vanishing cream, a deodorant or antiperspirant, hair remover, tanning or sun product, nail products, skin cleansing, a makeup, a perfumed soap, shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, a car care product.

According to any embodiment of the invention, the perfumed consumer product may also comprise zinc salt such as zinc ricinoleate, zinc acetate and/or zinc stearate, laureth-3, tetrahydroxypropyl ethylenediamine, propylene glycol or a mixture thereof.

According to a particular embodiment of the invention, the invention's perfumed consumer product is a liquid fabric softener comprising a fabric softener active base in amount comprised between 85 and 100% by weight, based on the total weight of the perfumed consumer product. The fabric softener active base may comprise dialkyl quaternary ammonium salts, dialkyl ester quaternary ammonium salts, Hamburg esterquat, triethanolamine quat, silicones and mixtures thereof. Optionally, the liquid fabric softener may further comprise a viscosity modifier in an amount comprised between 0.05 and 1% by weight, based on the total weight of the active base; preferably chosen in the group consisting of calcium chloride.

According to a particular embodiment of the invention, the invention's perfumed consumer product is an all-purpose cleaner comprising an all-purpose cleaner active base in amount comprised between 85 and 100% by weight, based on the total weight of the perfumed consumer product.

According to a particular embodiment of the invention, the invention's perfumed consumer product is a liquid detergent comprising liquid detergent active base in amount comprised between 85 and 100% by weight, based on the total weight of the perfumed consumer product. The liquid detergent active base may comprise anionic surfactant such as alkylbenzenesulfonate (ABS), linear alkylbenzene sulfonates (LAS), secondary alkyl sulfonate (SAS), primary alcohol sulfate (PAS), lauryl ether sulfate (LES), sodium lauryl ether sulfate (SLES), methyl ester sulfonate (MES); nonionic surfactant such as alkyl amines, alkanolamide, fatty alcohol poly(ethylene glycol) ether, fatty alcohol ethoxylate (FAE), ethylene oxide (EO) and propylene oxide (PO) copolymers, amine oxydes, alkyl polyglucosides, alkyl polyglucosamides; ormixtures thereof.

According to a particular embodiment of the invention, the invention's perfumed consumer product is a solid detergent comprising a solid detergent active base in amount comprised between 85 and 100% by weight, based on the total weight of the perfumed consumer product. The solid detergent active base may comprise at least one surfactant chosen in the group consisting of anionic, nonionic, cationic, zwiterionic surfactant and mixtures thereof. The surfactant in the solid detergent active base is preferably chosen in the group consisting of linear alkene benzene sulphonate (LABS), sodium laureth sulphate, sodium lauryl ether sulphate (SLES), sodium lauryl sulphate (SLS), alpha olefin sulphonate (AOS), methyl ester sulphonates (MES), alkyl polyglyucosides (APG), primary alcohol ethoxylates and in particular lauryl alcohol ethoxylates (LAE), primary alcohol sulphonates (PAS), soap and mixtures thereof. The soild detergent active base may comprise a further component, commonly used in powder detergent consumer product, selected from the group consisting of bleaching agents such as TAED (tetraacetylethylenediamine); buffering agent; builders such as zeolites, sodium carbonate or mixture thereof; soil release or soil suspension polymers; granulated enzyme particles such as cellulase, lipase, protease, mannanase, pectinase or mixtures thereof; corrosion inhibitor; antifoaming; sud suppressing agents; dyes; fillers such as sodium silicate, sodium sulfate or mixture thereof; source of hydrogen peroxide such as sodium percarbonate or sodium perborate; and mixtures thereof.

EXAMPLE

Example 1

Towel Treatment With Various Fabric Softener Formulations

In order to investigate the effect of the addition of a pro-perfume compound on the fragrance intensity and the freshness of a towel upon fabric softener treatment, the following fabric softener formulations have been prepared:

Formulation A-1 (inventive): A perfuming composition and the pro-perfume compound 3-(dodecylthio)-1-(2,6,6-trimethylcyclohex-3-en-1-yl)butan-1-one (HaloScent® D) have been combined to form a perfumed composition. The perfumed composition comprised an amount of perfuming composition of 98.0 wt. % and an amount of the pro-perfume compound of 2.0 wt. %. The resulting perfumed composition has then been incorporated into a standard fabric softener formulation at an amount of 1.0 wt. %, based on the total weight of the final fabric softener formulation. The amount of pro-perfume compound was 0.02 wt. % based on the total weight of the final fabric softener formulation.

Formulation A-2 (comparative): A perfuming composition and delta-damascone have been combined to form a perfumed composition. The perfumed composition comprised an amount of perfuming composition of 99.0 wt. % and an amount of delta-damascone of 1.0 wt. %. The resulting perfumed composition has then been incorporated into a standard fabric softener formulation at an amount of 1.0 wt. %, based on the total weight of the final fabric softener formulation. The amount of delta-damascone was 0.01 wt. % based on the total weight of the final fabric softener formulation.

Formulation B-1 (inventive): A perfuming composition and the pro-perfume compound 4-(dodecylthio)-4-(2,6,6-trimethylcyclohex-2-en-1-yl)butan-2-one (HaloScent® I) have been combined to form a perfumed composition. The perfumed composition comprised an amount of perfuming composition of 98.0 wt. % and an amount of the pro-perfume compound of 2.0 wt. %. The resulting perfumed composition has then been incorporated into a standard fabric softener formulation at an amount of 1.0 wt. %, based on the total weight of the final fabric softener formulation. The amount of the pro-perfume compound was 0.02 wt. % based on the total weight of the final fabric softener formulation.

Formulation B-2 (comparative): A perfuming composition and a combination of alpha-ionone and beta-ionone have been combined to form a perfumed composition. The perfumed composition comprised an amount of perfuming composition of 98.94 wt. % and an amount of alpha-ionone of 0.58 wt. % and beta-ionone of 0.48 wt. %. The resulting perfumed composition has then been incorporated into a standard fabric softener formulation at an amount of 1.0 wt. %, based on the total weight of the final fabric softener formulation. The amount of alpha-ionone was 0.0058 wt. % and the amount of beta-ionone was 0.0048 wt. % based on the total weight of the final fabric softener formulation.

The perfuming composition as used for the preparation of all of the above-mentioned formulations (A-1, A-2, B-1, B-2) had the following composition: 10-undecenal (3.21 wt. %), allyl (2-methylbutoxy)acetate and/or allyl (3-methylbutoxy)acetate (0.71 wt. %), benzyl acetate (12.5 wt. %), 5-heptyldihydro-2(3H)-furanone (7.14 wt. %), tricyclo[5.2.1.0$^{2,6}$]dec-3-en-8-y! acetate (8.93 wt. %), 4-(2-methyl-2-propanyl)cyclohexyl acetate (8.93 wt. %), (+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one (4.64 wt. %), 3,7-dimethyl-1,6-octadien-3-ol (15.36 wt. %), 2,6,-dimethyl-7-octen-2-ol (14.29 wt. %), 3,7-dimethyl-6-octen-1-ol (6.79 wt. %), methyl benzoate (4.62 wt. %), 1-(2-naphthyl)ethenone (2.5 wt. %), and 2-phenylethanol (10.36 wt. %).

The fabric softener as used for the preparation of all of the above-mentioned formulations (A-1, A-2, B-1, B-2) comprised the following ingredients:

| Ingredients | Amount (% wt) | Function |
|---|---|---|
| Methyl bis[ethyl(tallowate)]-2-hydroxyethyl ammonium methyl sulfate[1)] | 12.2 | Softening agent |
| Calcium chloride sol 10% | 0.4 | Viscosity modifier |
| 1,2-benzisothiazolin-3-one[2)] | 0.04 | Preservative |
| Water | 87.36 | |

[1)] Stepantex ® VL 90A- Stepan
[2)] Proxel ® GXL - Arch

The softener was prepared by weighting Methyl bis[ethyl (tallowate)]-2-hydroxyethyl ammonium methyl sulfate which was heated at 65° C. Then, Water and 1,2-benzisothiazolin-3-one were placed in the reactor and were heated at 65° C. under stirring. To the above mixture was added Methyl bis[ethyl (tallowate)]-2-hydroxyethyl ammonium methyl sulfate. The mixture was stirred 15 minutes and $CaCl_2$ was added. Then perfume was added. The mixture was stirred 15 minutes and was cooled down to room temperature under stirring (viscosity measure: result 35±5 mPas. (shear rate 106 $sec^{-1}$)).

Cotton terry towels (20 pieces, 18 cm * 18 cm, about 30 g each) were washed with 30 g of unperfumed detergent in a European washing machine (Miele Novotronic W300-33CH) at using the short cycle program. The wash was followed by a rinse at 900 rpm with 12.7 g of above concentrated fabric-softener. The terry towels were then line dried for 96 hours before being evaluated by a panel of 7 panelists.

After the fabric softener application has been performed for each of the aforementioned fabric softener formulations, a sensory panel consisting of 7 panelists (n=7) evaluated the treated towels with regard to their overall fragrance intensity and freshness. The evaluations have been carried out 4 days after the fabric softener applications have been completed.

With regard to the fragrance intensity, the panelists were asked to indicate the overall fragrance intensity on a scale from 1 to 7 (a higher value indicating a higher intensity) for each of the four above-mentioned fabric softener formulations (A-1/2, B-1/2).

From FIG. 1 it can be observed that the use of the pro-perfume compound 3-(dodecylthio)-1-(2,6,6-trimethylcyclohex-3-en-1-yl)butan-1-one (HaloScent® D) in combination with a perfuming composition as described hereinabove (fabric softener formulation A-1) led to a significant higher overall perceived fragrance intensity 4 days after completion of the fabric softener application compared to the direct use of the perfumery raw material that is also released by the aforementioned pro-perfume compound namely delta-damascone (fabric softener formulation A-2) (fragrance intensity of formulation A-1, 4.6; fragrance intensity of formulation A-2, 3.71). Said experiment indicates that the use of the respective pro-perfume compound in combination with a perfuming composition as described herein-above in a fabric softener is more effective in enhancing and prolonging the overall fragrance intensity of a typical perfuming composition compared to the direct use of the perfumery raw material that is also released by the pro-perfume compound.

Figure 2:
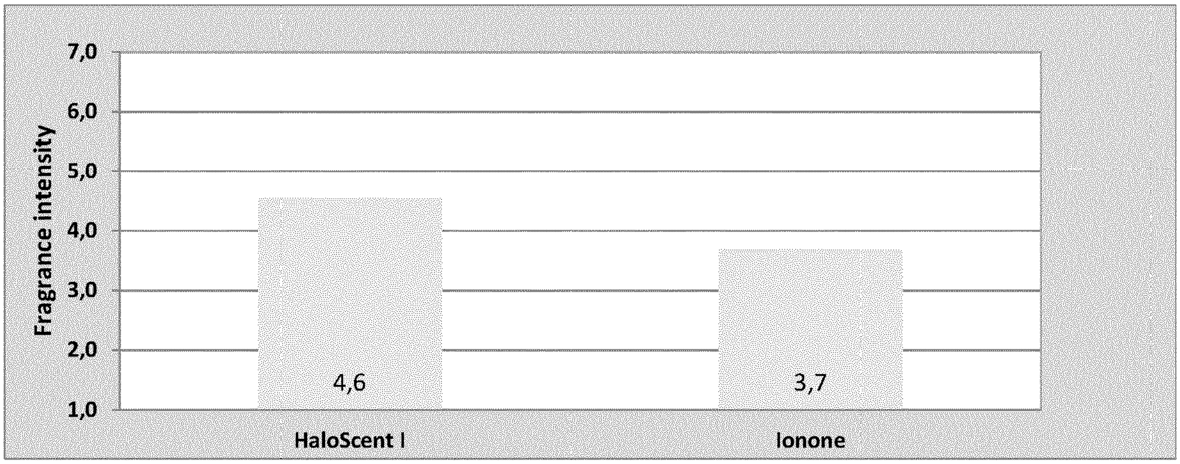
FIG. 2. Comparative sensory evaluation of the fragrance intensity of a towel upon treatment with a fabric softener formulation comprising a mixture of 4-(dodecylthio)-4-(2,6,6-trimethylcyclohex-2-en-1-yl)butan-2-one and 4-mbo (dodecylthio)-4-(2,6,6-trimethylcyclohex-1-en-1-yl)butan-2-one (HaloScent® I) or Ionone.

From FIG. 2 it can be observed that the use of the pro-perfume compound 4-(dodecylthio)-4-(2,6,6-trimethylcyclohex-2-en-1-yl)butan-2-one (HaloScent® I) in combination with a perfuming composition as described hereinabove led to a significantly higher overall perceived fragrance intensity 4 days after completion of the fabric softener application compared to the direct use of the perfumery raw material that is also released by the aforementioned pro-perfume compound namely alpha-ionone (fragrance intensity of formulation B-1, 6.29; fragrance intensity of formulation B-2). Said experiment shows that the use of the respective pro-perfume compound in combination with a perfuming composition as described herein-above in a fabric softener is more effective in enhancing and prolonging the overall fragrance intensity of a typical perfuming composition compared to the direct use of the perfumery raw material that is also released by the pro-perfume compound.

Concerning the freshness evaluation, the panelists were asked to indicate which fabric softener formulation they preferred (forced choice test), either the one comprising the respective pro-perfume compound (HaloScent® D or HaloScent® I, respectively) or the one directly comprising the perfumery raw material (delta-damascone or alpha-ionone, respectively) that is also released by the aforementioned pro-perfume compounds.

Figure 3:
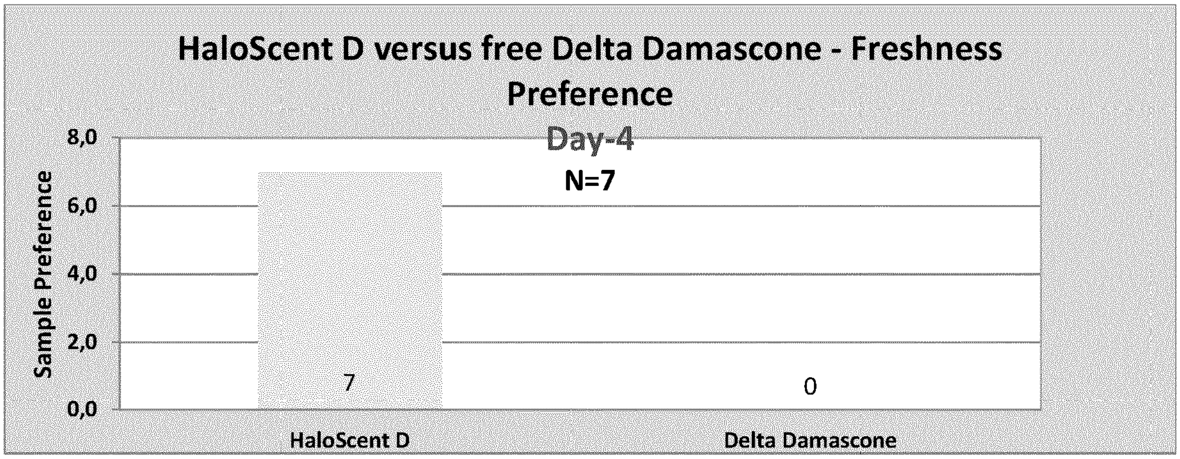
FIG. 3. Comparative sensory evaluation of the freshness of a towel upon treatment with a fabric softener formulation comprising 3-(dodecylthio)-1-(2,6,6-trimethylcyclohex-3-en-1-yl)butan-1-one (HaloScent® D) or delta-damascone.

FIG. 3 shows that each of the seven panelists preferred the fabric softener formulation comprising the pro-perfume compound (HaloScent® D) in combination with a perfuming composition as described herein-above over that directly comprising delta-damascone with regard to the perceived freshness of the towels four days after the fabric softener application had been completed. This shows that the use of the respective pro-perfume compound in combination with a perfuming composition as described herein-above in a fabric softener next to a typical perfuming composition leads to an improved freshness perception compared to the direct use of the perfumery raw material that is also released by the pro-perfume compound. Therefore, by the use of the respective pro-perfume compound the freshness perception can be influenced in a positive way.

Figure 4:
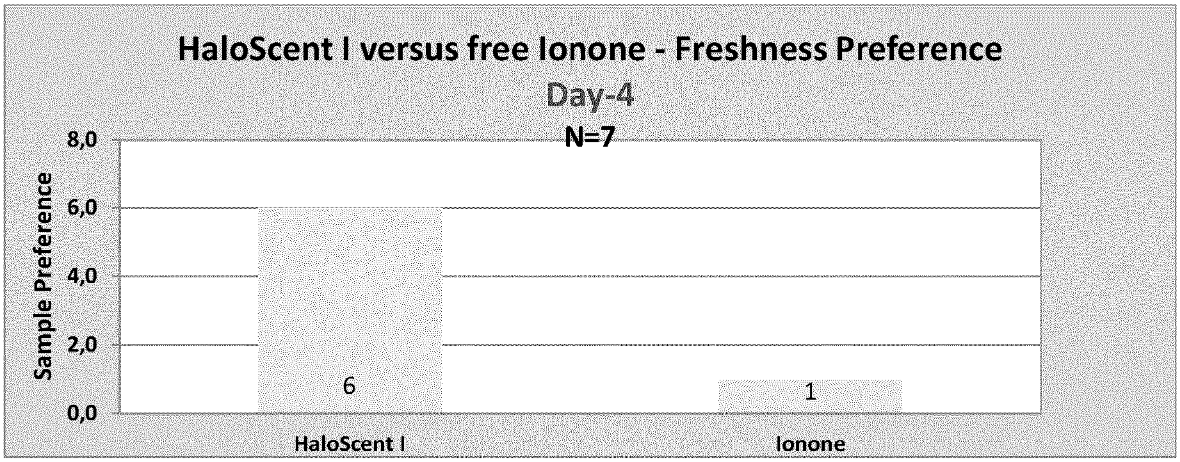
FIG. 4. Comparative sensory evaluation of the freshness of a towel upon treatment with a fabric softener formulation comprising a mixture of 4-(dodecylthio)-4-(2,6,6-trimethylcyclohex-2-en-1-yl)butan-2-one and 4-(dodecylthio)-4-(2,6,6-trimethylcyclohex-1-en-1-yl)butan-2-one (HaloScent® I) or a mixture of α- and β-Ionone.

Similarly, FIG. 4 shows that six out of seven panelists preferred the fabric softener formulation comprising the pro-perfume compound (HaloScent® I) in combination with a perfuming composition as described herein-above over that directly comprising alpha-ionone with regard to the perceived freshness of the towels four days after the fabric softener application had been completed. This likewise shows that the use of the respective pro-perfume compound in combination with a perfuming composition as described herein-above in a fabric softener next to a typical perfuming composition leads to an improved freshness perception compared to the direct use of the perfumery raw material that is also released by the pro-perfume compound. Therefore, by using the respective pro-perfume compound the freshness perception can be influenced in a positive way.

The above-mentioned results indicate that superior results with regard to the perceived freshness can be achieved when a pro-perfume compound in combination with a perfuming composition as described herein-above is used instead of the direct use of the perfumery raw material that is also released from the respective pro-perfume compound.

Example 2

Preparation of Perfumed Compositions:

A perfuming composition and the pro-perfume compound 3-(dodecylthio)-1-(2,6,6-trimethylcyclohex-3-en-1-yl)butan-1-one (HaloScent® D) have been combined to form a perfumed composition. The perfumed composition comprised an amount of perfuming composition of 98.0 wt. % and an amount of the pro-perfume compound of 2.0 wt. %.

Likewise, a perfuming composition and the pro-perfume compound 4-(dodecylthio)-4-(2,6,6-trimethylcyclohex-2-en-1-yl)butan-2-one and 4-(dodecylthio)-4-(2,6,6-trimethylcyclohex-1-en-1-yl)butan-2-one (HaloScent® I) have been combined to form a perfumed composition. The perfumed composition comprised an amount of perfuming composition of 98.0 wt. % and an amount of the pro-perfume compound of 2.0 wt. %.

In both cases, the perfuming composition as used for the preparation of the above-mentioned formulations had the following composition:

10-undecenal: 2.90 wt. %;
7-propyl-2H,4H-1,5-benzodioxepin-3-one: 0.02 wt. %;
allyl (2-methylbutoxy)acetate and/or allyl (3-methylbutoxy)acetate: 0.32 wt. %;
benzyl acetate: 10 wt. %;
(+/−)-(3-methoxy-2-methylpropyl)benzene: 0.97 wt. %;
3,7-dimethyl-6-octen-1-ol: 4.84 wt. %;
patchouli oil: 0.97 wt. %;
(+/−)-3-(4-isopropylphenyl)-2-methylpropanal: 0.97 wt. %;
2,6-dimethyl-7-octen-2-ol: 6.77 wt. %;
4-(2-methyl-2-propanyl)cyclohexyl acetate: 6.13 wt. %;
diethyl 1,4-cyclohexanedicarboxylate: 1.61 wt. %;
methyl 2-((1RS,2RS)-3-oxo-2-pentylcyclopentyl)acetate: 9.68 wt. %;
3-(3,3/1,1-dimethyl-5-indanyl)propanal: 0.06 wt. %;
(+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one: 4.19 wt. %;
lavandin oil: 0.97 wt. %;
(+/−)-(2,5-dimethyl-2,3-dihydro-1H-inden-2-yl)methanol: 0.97 wt. %;
(+/−)-3,7-dimethyl-1,6-octadien-3-ol: 6.77 wt. %;
methyl benzoate: 0.42 wt. %;
1-(2-naphthyl)ethanone: 2.26 wt. %;
(4E)-4-methyl-5-(4-methylphenyl)-4-pentenal: 0.10 wt. %;
(+1+1-(5-ethyl-5-methyl-1-cyclohexen-1-yl)-4-penten-1-one: 0.03 wt. %;
(+/−)-methyl 2-ethylhexanoate: 3.22 wt. %;
2-phenylethanol: 6.45 wt. %;
3-methyl-2-buten-1-yl acetate: 0.32 wt. %;
(−)-(2S)-1-oxo-1-(2-propanyloxy)-2-propanyl 2,2-dimethylpropanoate: 2.90 wt. %;
(2Z)-2-phenyl-2-hexenenitrile: 0.32 wt. %;
(+/−)-(2Z)-4,8-dimethyl-2,7-nonadien-4-ol: 1.61 wt. %;
1-[(1RS,2 RS)-1,2,8,8-tetramethyl-1,2, 3,4,5,6, 7,8-octahydro-2-naphthalenyl]ethanone, 14(2RS,3RS)-2,3,8,8-tetramethyl-1,2,3,4,5,6,7,8-octahydronaphthalen-2-yl) ethanone, 1-[(2RS,3RS,8aRS)-2,3,8,8-tetramethyl-1,2,3,5,6,7,8,8a-octahydro-2-naphthalenyl]ethanone, and 1-[(1RS,2RS,8aSR)-1,2,8,8-tetramethyl-1,2,3,5,6,7,8,8a-octahydro-2-naphthalenyl]ethanone: 1.61 wt. %;
3-(4,4-dimethyl-1-cyclohexen-1-yl)propanal: 0.06 wt. %;
(+/−)-5-heptyldihydro-2(3H)-furanone: 4.84 wt. %;
(+/−)-2,2,5-trimethyl-5-pentylcyclopentanone: 1.61 wt. %;
tricyclo[5.2.1.02,6]dec-3-en-8-yl acetate: 8.06 wt. %.

Example 3

Preparation of Perfumed Compositions:

A perfuming composition and the pro-perfume compound 3-(dodecylthio)-1-(2,6,6-trimethylcyclohex-3-en-1-yl)butan-1-one (HaloScent® D) have been combined to form a perfumed composition. The perfumed composition comprised an amount of perfuming composition of 98.0 wt. % and an amount of the pro-perfume compound of 2.0 wt. %.

Likewise, a perfuming composition and the pro-perfume compound 4-(dodecylthio)-4-(2,6,6-trimethylcyclohex-2-en-1-yl)butan-2-one and 4-(dodecylthio)-4-(2,6,6-trimethylcyclohex-1-en-1-yl)butan-2-one (HaloScent® I) have been combined to form a perfumed composition. The perfumed composition comprised an amount of perfuming composition of 98.0 wt. % and an amount of the pro-perfume compound of 2.0 wt. %.

In both cases, the perfuming composition as used for the preparation of the above-mentioned formulations had the following composition:

10-undecenal: 3.21 wt. %;
allyl (2-methylbutoxy)acetate and/or allyl (3-methylbutoxy)acetate: 0.71 wt. %;
methyl benzoate: 0.46 wt. %;
benzyl acetate: 10.71 wt. %;
cedarwood oil: 5.36 wt. %;
3,7-dimethyl-6-octen-1-ol: 6.79 wt. %;
patchouli oil: 0.36 wt. %;
2,6-dimethyl-7-octen-2-ol: 14.29 wt. %;
4-(2-methyl-2-propanyl)cyclohexyl acetate: 5.36 wt. %;
(+/−)-5-heptyldihydro-2(3H)-furanone: 7.14 wt. %;
2-hexyl-3-phenyl-2-propenal: 6.07 wt. %;
(+/−)-(3E)-3-methyl-4-(2,6,6-trimethyl-2-cyclohexen-1-yl)-3-buten-2-one and (+/−)-(1E)-1-(2,6,6-trimethyl-2-cyclohexen-1-yl)-1-penten-3-one: 3.57 wt. %;
lavandin oil: 0.71 wt. %;
(+/−)-3,7-dimethyl-1,6-octadien-3-ol: 10.71 wt. %;
1-(2-naphthyl)ethanone: 2.50 wt. %;
2-phenylethanol: 7.14 wt. %;
(−)-(2S)-1-oxo-1-(2-propanyloxy)-2-propanyl 2,2-dimethylpropanoate: 1.79 wt. %;
1-[(1RS,2 RS)-1,2,8,8-tetramethyl-1,2, 3,4,5,6, 7,8-octahydro-2-naphthalenyl]ethanone, 1-((2RS,3RS)-2,3,8,8-tetramethyl-1,2,3,4,5,6,7,8-octahydronaphthalen-2-yl) ethanone, 1-[(2RS,3RS,8aRS)-2,3,8,8-tetramethyl-1,2,3,5,6,7,8,8a-octahydro-2-naphthalenyl]ethanone, and 1-[(1RS,2RS,8aSR)-1,2,8,8-tetramethyl-1,2,3,5,6,7,8,8a-octahydro-2-naphthalenyl]ethanone: 1.79 wt. %;
tricyclo[5.2.1.02,6]dec-3-en-8-yl acetate: 7.14 wt. %.

Example 4

Preparation of Transparent Isotropic Shampoo Formulations Comprising Invention's Perfumed Composition A typical unperfumed transparent isotropic shampoo formulation is listed in Table 1. The unperfumed shampoo formulation is prepared by dispersing Polyquaternium-10 in water. The remaining ingredients of Phase A are mixed separately by addition of one after the other while mixing well after each adjunction. This pre-mix is added to the Polyquaternium-dispersion and mixed for another 5 min. Then, the premixed Phase B and the premixed Phase C are added (Monomuls® 90L-12 is heated to melt in Texapon® NSO IS) while agitating. Phase D and Phase E are added while agitating. The pH is adjusted with a citric acid solution to 5.5-6.0.

TABLE 1

Composition of a typical unperfumed transparent isotropic shampoo formulation.

| Phase | Ingredients | Amount [wt %] |
|---|---|---|
| A | Deionized water | 44.4 |
| | Polyquaternium-10 (1) | 0.3 |
| | Glycerin 85% (2) | 1.0 |
| | DMDM Hydantoin (3) | 0.2 |
| B | Sodium laureth sulfate (4) | 28.0 |
| | Cocamidopropyl betaine (5) | 3.2 |
| | Disodium cocoamphodiacetate (6) | 4.0 |
| | Ethoxy (20) stearyl alcohol (7) | 1.0 |
| C | Sodium laureth sulfate (4) | 3.0 |
| | Glyceryl laureate (8) | 0.2 |
| D | Deionized water | 1.0 |
| | Sodium methylparaben (9) | 0.1 |
| E | Sodium chloride (10% aqueous solution) | 15.0 |
| | Citric acid (10% aqueous solution to pH 5.5-6.0) | q.s. |

(1) Ucare ® Polymer JR-400; origin: Noveon
(2) Origin: Brenntag Schweizerhall AG
(3) Glydant ®; origin: Lonza
(4) Texapon ® NSO IS; origin: Cognis
(5) Tego ® Betain F 50; origin: Evonik
(6) Amphotensid GB 2009; origin: Zschimmer & Schwarz
(7) Brij ® S20; origin: Croda
(8) Monomuls ® 90 L-12; origin: Gruenau GmbH
(9) Nipagin Monosodium; origin: NIPA The perfumed shampoo formulation is then obtained by adding, under gentle shaking, a perfumed composition of Examples 1 to 3 (0.15 to 1.3% by weight relative to the total weight of the unperfumed shampoo formulation) into the unperfumed shampoo formulation listed in Table 1.

Example 5

Preparation of Pearly Shampoo Formulations Comprising Invention's Perfumed Composition A typical unperfumed pearly shampoo formulation is listed in Table 2. The unperfumed shampoo formulation is prepared by dispersing Tetrasodium EDTA, Guar hydroxypropyltrimonium chloride and Polyquaternium-10 in water. NaOH (10% aqueous solution, Phase B) is added once Phase A is homogeneous. Then, the premixed Phase C is added, and the mixture heated to 75° C. Phase D ingredients are added and mixed until the mixture is homogeneous. The mixture is cooled. At 45° C., Phase E ingredients are added while mixing. The final viscosity is adjusted with NaCI (25% aqueous solution) and a pH of 5.5-6.0 is adjusted with NaOH (10% aqueous solution).

TABLE 2

Composition of a typical pearly shampoo formulation.

| Phase | Ingredients | Amount [wt %] |
|---|---|---|
| A | Deionized water | 45.97 |
| | Tetrasodium EDTA (1) | 0.05 |
| | Guar hydroxypropyl-trimonium chloride (2) | 0.05 |
| | Polyquaternium-10 (3) | 0.075 |
| B | NaOH (10% aqueous solution) | 0.30 |
| C | Ammonium lauryl sulfate (4) | 34.00 |
| | Ammonium laureth sulfate (5) | 9.25 |
| | Cocamidopropyl betaine (6) | 2.00 |
| | Dimethicone (&) $C_{12-13}$ pareth-4 (&) $C_{12-13}$ pareth-23 (&) salicylic acid (7) | 2.50 |
| D | Cetyl alcohol (8) | 1.20 |
| | Cocamide MEA (9) | 1.50 |
| | Glycol distearate (10) | 2.00 |
| E | Methylchloroisothiazolinone & methylisothiazolinone (11) | 0.10 |

TABLE 2-continued

| Composition of a typical pearly shampoo formulation. | | |
|---|---|---|
| Phase | Ingredients | Amount [wt %] |
| | D-Panthenol 75% [12] | 0.10 |
| | Deionized water | 0.30 |
| F | Sodium chloride (25% aqueous solution) | 0.60 |

[1] EDETA ® B Powder; origin: BASF
[2] Jaguar ® C14 S; origin: Rhodia
[3] Ucare ® Polymer JR-400; origin: Noveon
[4] Sulfetal ® LA B-E; origin: Zschimmer & Schwarz
[5] Zetesol ® LA; origin: Zschimmer & Schwarz
[6] Tego ® Betain F 50; origin: Evonik
[7] Xiameter ® MEM-1691; origin: Dow Corning
[8] Lanette ® 16; origin: BASF
[9] Comperlan ® 100; origin: Cognis
[10] Cutina ® AGS; origin: Cognis
[11] Kathon ® CG; origin: Rohm & Haas
[12] D-Panthenol; origin: Roche A perfumed pearly shampoo formulation is then obtained by adding, under gentle shaking, 15 a perfumed composition of Examples 1 to 3 (0.15 to 1.3% by weight relative to the total weight of the unperfumed shampoo formulation) (0.05 to 0.50% by weight relative to the total weight of the unperfumed shampoo formulation) into the unperfumed pearly shampoo formulation listed in Table 2.

Example 6

Preparation of Rinse-off Hair Conditioner Formulations Comprising an Invention's Perfumed Composition A typical unperfumed rinse-off hair conditioner formulation is listed in Table 3. The unperfumed rinse-off hair conditioner formulation is prepared by mixing the ingredients of Phase A until an uniform mixture was obtained. Tylose® is allowed to completely dissolve. Then the mixture is heated to 70-75° C. The ingredients of Phase B are combined and melted at 70-75° C. Then the ingredients of Phase B are added to Phase A with good 30 agitation, and the mixing is continued until that the mixture has a temperature of 60° C.

Then, the ingredients of Phase C are added while agitating and keeping mixing until the mixture cooled to 40° C. The pH is adjusted with a citric acid solution to 3.5-4.0.

TABLE 3

| Composition of a typical rinse-off hair conditioner formulation. | | |
|---|---|---|
| Phase | Ingredients | Amount [wt %] |
| A | Deionized water | 81.8 |
| | Behentrimonium chloride [1] | 2.5 |
| | Hydroxyethylcellulose [2] | 1.5 |
| B | Cetearyl alcohol [3] | 4.0 |
| | Glyceryl stearate (and) PEG-100 stearate [4] | 2.0 |
| | Behentrimonium metho-sulfate (and) cetyl alcohol (and) butylene glycol [5] | 4.0 |
| | Ethoxy (20) stearyl alcohol [6] | 1.0 |
| C | Amodimethicone (and) Trideceth-12 (and) Cetrimonium chloride [7] | 3.0 |
| | Chlorhexidine digluconate (20% aqueous solution) [8] | 0.2 |
| D | Citric acid (10% aqueous solution tol pH 3.5-4.0) | q.s. |

[1] Genamin ® KDMP; origin: Clariant
[2] Tylose ® H10 Y G4; origin: Shin Etsu
[3] Lanette ® O; origin: BASF
[4] Arlacel ® 165; origin: Croda
[5] Incroquat ® Behenyl TMS-50-PA- (MH); origin: Croda
[6] Brij ® S20; origin: Croda
[7] Xiameter ® MEM-949; origin: Dow Corning
[8] Origin: Alfa Aesar A perfumed rinse-off hair conditioner formulation is then obtained by adding, under gentle shaking, a perfumed composition of Examples 1 to 3 (0.25 to 1.5% by weight relative to the total weight of the unperfumed conditioner formulation) into the unperfumed rinse-off hair conditioner formulation listed in Table 3.

Example 7

Preparation of Structured Shower Gel Formulations Comprising an Invention's Perfumed Composition A typical unperfumed structured shower gel formulation is listed in Table 4. A perfumed structured shower gel is prepared by adding, under gentle shaking, a perfumed composition of Examples 1 to 3 (0.15 to 2% by weight relative to the total weight of the structured shower gel) into the unperfumed structured shower gel formulation of Table 4.

TABLE 4

| Composition of a typical unperfumed structured shower gel formulation. | |
|---|---|
| Ingredients | Amount [wt %] |
| Deionized water | 49.35 |
| Tetrasodium EDTA [1] | 0.05 |
| Acrylates co-polymer [2] | 6.00 |
| Sodium $C_{12-15}$ pareth sulfate [3] | 35.00 |
| Sodium hydroxide (20% aqueous solution) | 1.00 |
| Cocamidopropyl betaine [4] | 8.00 |
| Methylchloroisothiazolinone and methylisothiazolinone [5] | 0.10 |
| Citric acid (40% aqueous solution) | 0.50 |

[1] EDETA B powder; origin: BASF
[2] Carbopol Aqua SF-1 polymer; origin: Noveon
[3] Zetesol AO 328 U; origin: Zschimmer & Schwarz
[4] Tego Betain F 50; origin: Goldschmidt
[5] Kathon ® CG; origin: Rohm & Haas Example 8

Preparation of Transparent Shower Gel Formulations Comprising an Invention's Perfumed Composition A typical unperfumed transparent shower gel formulation is listed in Table 5. A perfumed transparent shower gel is prepared by adding, under gentle shaking, a perfumed composition of Examples 1 to 3 (0.55 to 2% by weight relative to the total weight of the transparent shower gel) into the unperfumed transparent shower gel formulation of Table 5.

TABLE 5

| Composition of a typical unperfumed transparent shower gel formulation | |
|---|---|
| Ingredients | Amount [wt %] |
| Deionized water | 52.40 |
| Tetrasodium EDTA [1] | 0.10 |
| Sodium benzoate | 0.50 |
| Propylene glycol | 2.00 |
| Sodium $C_{12-15}$ pareth sulfate [2] | 35.00 |
| Cocamidopropyl betaine [3] | 8.00 |

TABLE 5-continued

| Composition of a typical unperfumed transparent shower gel formulation | |
|---|---|
| Ingredients | Amount [wt %] |
| Polyquaternium-7 [(4)] | 0.20 |
| Citric acid (40% aqueous solution) | 1.00 |
| Sodium chloride | 0.80 |

[(1)] EDETA B powder; origin: BASF
[(2)] Zetesol AO 328 U; origin: Zschimmer & Schwarz
[(3)] Tego Betain F 50; origin: Goldschmidt
[(4)] Merquat ® 550; origin: Lubrizol Example 9

Preparation of Milky Shower Gel Formulations Comprising an Invention's Perfumed Composition A typical unperfumed milky shower gel formulation is listed in Table 6. A perfumed milky shower gel is prepared by adding, under gentle shaking, a perfumed composition of Examples 1 to 3 (0.15 to 2% by weight relative to the total weight of the milky shower gel) into the unperfumed milky shower gel formulation of Table 6.

TABLE 6

| Composition of a typical unperfumed milky shower gel formulation. | |
|---|---|
| Ingredients | Amount [wt %] |
| Deionized water | 50.95 |
| Tetrasodium EDTA [(1)] | 0.05 |
| Sodium benzoate | 0.50 |
| Glycerin (86% aqueous solution) | 3.50 |
| Sodium laureth sulfate [(2)] | 27.00 |
| Polyquaternium-7 [(3)] | 1.00 |
| Coco-betaine [(4)] | 6.00 |
| PEG-120 Methyl glucose trioleate [(5)] | 1.00 |
| Citric acid (40% aqueous solution) | 1.00 |
| Glycol distearate & laureth-4 & cocamidopropyl betaine [(6)] | 3.00 |
| Sodium chloride (20% aqueous solution) | 5.00 |
| PEG-40 hydrogenated castor oil [(7)] | 1.00 |

[(1)] EDETA ® B powder; origin: BASF
[(2)] Texapon ® NSO IS; origin: Cognis
[(3)] Merquat ® 550; origin: Lubrizol
[(4)] Dehyton ® AB-30; origin: Cognis
[(5)] Glucamate ® LT; origin: Lubrizol
[(6)] Euperlan ® PK 3000 AM; origin: Cognis
[(7)] Cremophor ® RH 40; origin: BASF Example 10

Preparation of Anhydrous Antiperspirant Spray Formulations Comprising an Invention's Perfumed Composition A typical unperfumed anhydrous antiperspirant spray formulation is listed in Table 7. The anhydrous antiperspirant spray formulation is prepared by using a high-speed stirrer. Silica and Quaternium-18-hectorite are added to the mixture of isopropyl myristate and cyclomethicone. Once completely swollen, aluminium chlorohydrate is added portion-wise under stirring until the mixture becomes homogeneous and without lumps.

TABLE 7

| Composition of a typical unperfumed anhydrous antiperspirant spray. | |
|---|---|
| Ingredients | Amount [wt %] |
| Cyclomethicone [(1)] | 53.51 |
| Isopropyl myristate | 9.04 |
| Silica [(2)] | 1.03 |
| Quaternium-18-hectorite [(3)] | 3.36 |
| Aluminium chlorohydrate [(4)] | 33.06 |

[(1)] Dow Corning ® 345 Fluid; origin: Dow Corning
[(2)] Aerosil ® 200; origin: Evonik
[(3)] Bentone ® 38; origin: Elementis Specialities
[(4)] Micro Dry Ultrafine; origin: Reheis The perfumed formulation is then obtained by adding a perfumed composition of Examples 1 to 3 (1% by weight relative to the total weight of the antiperspirant spray formulation) into the unperfumed antiperspirant spray formulation of Table 7.

The aerosol cans were filled with 25% Suspension of the suspension and 75% of Propane/Butane (2,5 bar).

Example 11

Preparation of Deodorant Spray Emulsion Formulations Comprising an Invention's Perfumed Composition A typical deodorant spray emulsion formulation is prepared by mixing and dissolving all the ingredients according to the sequence of Table 8. Then a perfumed composition of Examples 1 to 3 (1.55% by weight relative to the total weight of the deodorant spray formulation) are added under gentle shaking. Then aerosol cans are filled, and the propellant is crimped and added. Aerosol filling: 40% active solution 60% propane butane (2.5 bar).

TABLE 8

| Composition of a typical unperfumed deodorant spray formulation. | |
|---|---|
| Ingredients | Amount [wt %] |
| Ethanol (95%) | 90.65 |
| Triclosan [(1)] | 0.26 |
| Isopropyl myristate | 9.09 |

[(1)] Irgasan ® DP 300; origin: BASF

Example 12

Preparation of Deodorant Stick Formulations Comprising an Invention's Perfumed Composition A typical unperfumed deodorant stick formulation is listed in Table 9. The deodorant stick formulation is obtained by weighing all the components of Part A and heating to 70-75° C. Ceteareth-25 is added once the other Part A ingredients are mixed and heated. Once the Ceteareth-25 is dissolved, stearic acid is added. Part B is prepared by dissolving Triclosan in 1,2-propylene glycol. Evaporated water is compensated. Then, slowly, under mixing, Part B is poured into Part A.

TABLE 9

| Composition of a typical unperfumed deodorant stick formulation. | | |
|---|---|---|
| Phase | Ingredients | Amount [wt %] |
| A | Stearic acid | 5.05 |
| | 1,2-Propylene glycol | 41.87 |
| | Sodium hydroxide (20% aqueous solution) | 4.24 |
| | Water | 30.30 |
| | Tetrasodium EDTA (1) | 0.10 |
| | Ceteareth-25 (2) | 1.52 |
| | PPG-3 Myristyl ether (3) | 1.52 |
| B | 1,2-Propylene glycol | 15.14 |
| | Triclosan (4) | 0.25 |

(1) Edeta ® B Power; origin: BASF
(2) Cremophor ® A25; origin: BASF
(3) Tegosoft ® APM; origin: Evonik
(4) Irgasan ® DP 300; origin: BASF The perfumed deodorant stick formulation is then obtained by adding a perfumed composition of Examples 1 to 3 (0.95% by weight relative to the total weight of the deodorant stick formulation) under gentle shaking. To stock, a plastic bag is put into the bucket to be sealed after cooling. Moulds were filled at about 70° C.

Example 13

Preparation of Deodorant Roll-On Formulations Comprising an Invention's Perfumed Composition A typical unperfumed deodorant roll-on formulation is listed in Table 10. Part A is prepared by sprinkling little-by-little the hydroxyethylcellulose into the water, whilst rapidly stirring with a turbine until the hydroxyethylcellulose is entirely swollen giving a limpid gel. Part B is slowly poured into Part A, whilst continuing stirring until the entire mixture is homogeneous. Then Part C is added.

TABLE 10

| Composition of a typical unperfumed deodorant roll-on formulation. | | |
|---|---|---|
| Phase | Ingredients | Amount [wt %] |
| A | Water | 50.51 |
| | Hydroxyethylcellulose (1) | 0.71 |
| B | Ethanol (95%) | 40.40 |
| | 1,2-Propylene glycol | 5.05 |
| | Triclosan (2) | 0.30 |
| C | PEG-40 hydrogenated castor oil (3) | 3.03 |

(1) Natrosol ® 250 H; origin: Ashland
(2) Irgasan ® DP 300; origin: BASF
(3) Cremophor ® RH 40; origin: BASF The perfumed deodorant roll-on formulation is then obtained by adding a perfumed composition of Examples 1 to 3 (0.95% by weight relative to the total weight of the deodorant stick formulation) under gentle shaking.

Example 14

Preparation of Day Cream Base O/W Emulsions Comprising an Invention's Perfumed Composition A typical day cream base 0/W emulsion formulation comprising an invention's compound of formula (I) is listed in Table 11 Phases A and B are heated separately to 70-75° C., then Phase A is added to Phase B and vacuum is applied. The mixture is stirred and cooled to 55° C. for 15 min. After cooling to room temperature, phenoxyethanol (and) piroctone olamine (Phase C) are added when a temperature of 45° C. is reached. The mixture is stirred for 5 min before sodium carbomer (Phase D), a perfumed composition of Examples 1 to 3 and at least one of the invention's compounds of formula (I) (Phase E) are added. The mixture is stirred for 3 min, then the stirring was stopped for 15 min. When the temperature of the mixture reaches 30° C., the stirring is resumed for another 15 min until the cream becomes homogeneous, glossy and without lumps. If necessary the pH is adjusted to 6.70-7.20 with Glydant® , Phenoni® p or Nipaguard® P05 or to 6.30-7.00 with Nikkoguard® .

TABLE 11

| Composition of a typical day cream base O/W emulsion. | | |
|---|---|---|
| Phase | Ingredients | Amount [wt %] |
| A | Steareth-2 (and) PEG-8 Distearate(1) | 5.0 |
| | Cetyl alcohol | 0.5 |
| | Ceteth-20 (and) glyceryl stearate (and) PEG-6 stearate (and) Steareth-20 (2) | 4.0 |
| | Squalan (3) | 1.0 |
| | Paraffin oil (4) | 2.0 |
| | Petrolatum (5) | 5.5 |
| B | Deionized water | 75.9 |
| | Propylene glycol | 5.0 |
| C | Phenoxyethanol (and) Piroctone olamine (6) | 0.6 |
| D | Sodium carbomer (7) | 0.2 |
| E | Perfumed composition of Example 1 or 2 or 3 | 0.3 |

(1)Arlacel ® 985; origin: Croda
(2) Tefose ® 2561; origin: Gattefossé
(3) Biolip P 90; origin: Gattefossé
(4) Mineral oil 30-40 CPS
(5) Petroleum jelly
(6) Nipaguard ® PO 5; origin: Clariant
(7) PNC 400

Example 15

Preparation of Liquid Detergent Formulations Comprising Invention's Perfumed Composition A typical liquid detergent formulation is prepared by mixing the ingredients listed in Table 12. Then a perfumed composition of Examples 1 to 3 (0.35 to 1.8% by weight relative to the total weight of the liquid detergent) is added under gentle shaking into the unperfumed liquid detergent formulation of Table 12.

TABLE 12

| Composition of a typical unperfumed liquid detergent formulation. | |
|---|---|
| Ingredients | Amount [wt %] |
| Sodium $C_{14-17}$ alkyl sec. sulfonate (1) | 7.0 |
| Fatty acids, $C_{12-18}$ and $C_{18}$-unsaturated (2) | 7.5 |
| $C_{12/14}$ fatty alcohol polyglycol ether with 7 mol EO (3) | 17.0 |
| Triethanolamine | 7.5 |
| Propylene glycol | 11.0 |
| Citric acid | 6.5 |
| Potassium hydroxyde | 9.5 |
| Properase ® L (4) | 0.2 |
| Puradax ® EG L (4) | 0.2 |
| Purastar ® ST L (4) | 0.2 |
| Acrylates/Steareth-20 methacrylate structuring crosspolymer (5) | 6.0 |
| Deionized water | 27.4 |

(1) Hostapur ® SAS 60; origin: Clariant
(2) Edenor ® K 12-18; origin: Cognis
(3) Genapol ® LA 070; origin: Clariant
(4) Origin: Genencor International
(5) Aculyn ® 88; origin: Dow Chemicals

Example 16

Preparation of Hand Dishwash Formulations Comprising an Invention's Perfumed Composition A typical unperfumed hand dishwash formulation is listed in Table 13. The unperfumed hand dishwash is prepared by mixing water with sodium hydroxide and diethanolamide. Then the linear alkylbenzene sulfonic acid is added. After neutralizing, the remaining ingredients are added and the pH is adjusted to 7-8 if necessary.

TABLE 13

Composition of a typical unperfumed hand dishwash formulation.

| Ingredients | Amount [wt %] |
|---|---|
| Linear alkylbenzene sulfonic acid (1) | 20.0 |
| Diethanolamide (2) | 3.5 |
| Sodium hydroxide (50%) (3) | 3.4 |
| Secondary alcohol ethoxolate (4) | 2.5 |
| Sodium xylene sulfonate | 6.3 |
| Water | 64.3 |

(1) Biosoft ® S-118; origin: Stepan
(2) Ninol ® 40-CO; origin: Stepan
(3) Stepanate ® SXS; origin: Stepan
(4) Tergitol ® 15-S-9; origin: Dow Chemicals The perfumed hand dishwash formulation is then obtained by adding a perfumed composition of Examples 1 to 3 (0.95% by weight relative to the total weight of the hand dishwash formulation) under gentle shaking into the unperfumed hand dishwash formulation of Table 13.

Example 17

Preparation of an all-Purpose Hard Surface Cleaner Formulations Comprising an Invention's Perfumed Composition The unperfumed all-purpose hard surface cleaner is prepared by mixing ingredients listed below:

| | |
|---|---|
| Neodol ® 91-8 (origin: Shell Chemicals) | 5.0% by weight |
| Marlon ® A 375 (origin: Hüls AG) | 4.0% by weight |
| Sodium cumolsulphonate | 2.0% by weight |
| Kathon ® CG (origin: Rohm and Haas) | 0.2% by weight |
| Deionized water | 88.8% by weight |

The perfumed all-purpose hard surface cleaner formulation is then obtained by adding a perfumed composition of Examples 1 to 3 (1.5% by weight relative to the total weight of the all-purpose hard surface cleaner formulation) under gentle shaking into the unperfumed all-purpose hard surface cleaner formulation mentioned above.

Example 18

Preparation of a Rinse-Off Hair Conditioning Hard Surface Cleaner Formulations Comprising an Invention's Perfumed Composition A typical unperfumed rinse-off hair conditioner formulation is listed in Table 14. The unperfumed rinse-off hair conditioner formulation is prepared by mixing the ingredients of Phase A until an uniform mixture was obtained. Tylose® is allowed to completely dissolve. Then the mixture is heated to 70-75° C. The ingredients of Phase B are combined and melted at 70-75° C. Then the ingredients of Phase B are added to Phase A with good agitation, and the mixing is continued until that the mixture has a temperature of 60° C. Then, the ingredients of Phase C are added while agitating and keeping mixing until the mixture cooled to 40° C. The pH is adjusted with a citric acid solution to 3.5-4.0.

TABLE 14

Composition of a typical rinse-off hair conditioner formulation.

| Phase | Ingredients | Amount [wt %] |
|---|---|---|
| A | Deionized water | 81.8 |
| | Behentrimonium chloride (1) | 2.5 |
| | Hydroxyethylcellulose (2) | 1.5 |
| B | Cetearyl alcohol (3) | 4.0 |
| | Glyceryl stearate (and) PEG-100 stearate (4) | 2.0 |
| | Behentrimonium metho-sulfate (and) cetyl alcohol (and) butylene glycol (5) | 4.0 |
| | Ethoxy (20) stearyl alcohol (6) | 1.0 |
| C | Amodimethicone (and) Trideceth-12 (and) Cetrimonium chloride (7) | 3.0 |
| | Chlorhexidine digluconate (20% aqueous solution) (8) | 0.2 |
| D | Citric acid (10% aqueous solution tol pH 3.5-4.0) | q.s. |

(1) Genamin ® KDMP; origin: Clariant
(2) Tylose ® H10 Y G4; origin: Shin Etsu
(3) Lanette ® O; origin: BASF
(4) Arlacel ® 165; origin: Croda
(5) Incroquat ® Behenyl TMS-50-PA- (MH); origin: Croda
(6) Brij ® S20; origin: Croda
(7) Xiameter ® MEM-949; origin: Dow Corning
(8) Origin: Alfa Aesar A perfumed rinse-off hair conditioner formulation is then obtained by adding, under gentle shaking, the perfumed composition of Examples 1 to 3 (0.25 to 1.5% by weight relative to the total weight of the unperfumed conditioner formulation) into the unperfumed rinse-off hair conditioner formulation listed in Table 14.

The invention claimed is:

1. A method of conferring, improving, enhancing or modifying the freshness of a perfuming composition, the method comprising the step of adding at least one pro-perfume compound to the perfuming composition;

wherein the pro-perfume compound is a linear polysiloxane co-polymer comprising at least one respecting unit of formula (III)

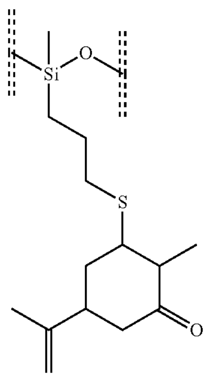

wherein the double hatched lines indicate the bonding to another repeating unit; or wherein the pro-perfume compound is a compound of formula (IV)

P—S—G—Q wherein

P represents a radical selected from the group consisting of formulae (P-1) to (P-14), in the form of any one of its isomers:

(P-1)

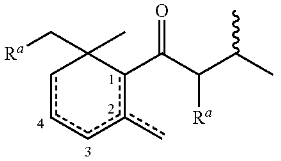

(P-2)

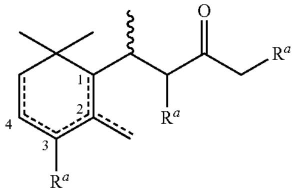

(P-3)

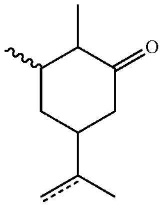

(P-4)

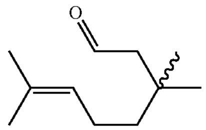

(P-5)

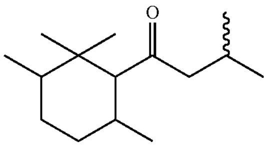

(P-6)

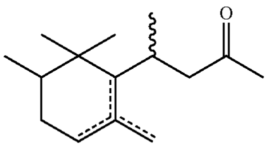

(P-7)

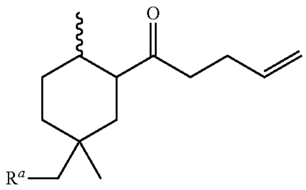

(P-8)

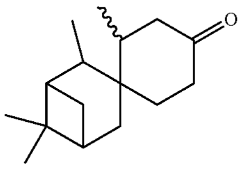

-continued (P-9)

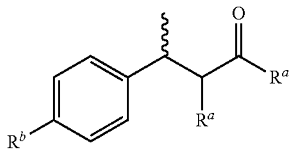

(P-10)

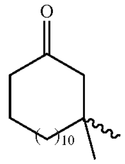

(P-11)

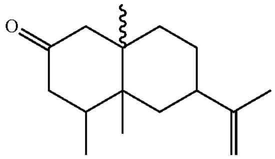

(P-12)

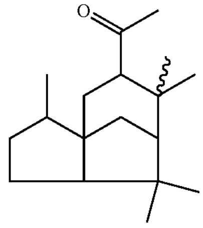

(P-13)

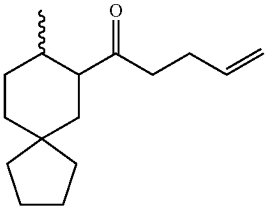

(P-14)

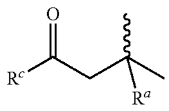

in which formulae the wavy lines indicates the location of the bond between said P and S and the dotted lines represent a single or double bond, $R^a$ being a hydrogen atom or a methyl group and $R^b$ representing a hydrogen atom, a hydroxyl or methoxy group or a $C_1$-$C_4$ linear or branched alkyl group and $R^c$ representing a hydrogen atom or a $C_1$-$C_4$ linear or branched alkyl group, G represents a divalent radical derived from a linear or branched alkyl or alkenyl radical having from 2 to 15 carbon atoms, optionally substituted with one or more groups selected from the group consisting of —$OR^9$, —$N(R^9)_2$, —$COOR^9$ and $R^9$ groups, in which $R^9$ represents a hydrogen atom or a $C_1$ to $C_6$ alkyl or alkenyl group; and Q represents a hydrogen atom; and wherein the perfuming composition comprises at least one perfuming ingredient imparting fruity and/or woody and/or fresh and/or floral and/or green odor note.

2. The method according to claim 1, wherein the pro-perfume compound of formula (I) is a compound of formula a)

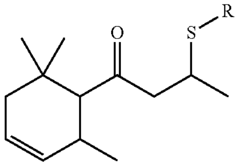

b)

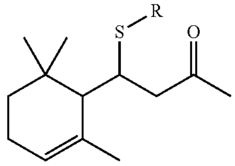

c)

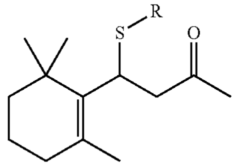

d)

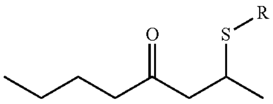

or any combination thereof;

wherein R represents a $C_1$-$C_{20}$ alkyl or alkenyl group.

3. The method according to claim 1, wherein the pro-perfume compound of formula (I) is 3-(dodecylthio)-1-(2,6, 6-trimethylcyclohex-3-en-1-yl)butan-1-one, 4-(dodecylthio)-4-(2,6, 6-trimethylcyclohex-1-en-1-yl)butan-2-one, 4-(dodecylthio)-4-(2,6,6-trimethylcyclohex-2-en-1-yl)butan-2-one, or a mixture thereof.

4. The method according to claim 1, wherein the at least one perfuming ingredient imparting fruity odor note is selected from the group consisting of compound groups A, B, C, D, or any mixture thereof, wherein:

perfuming ingredient of group A is selected from the group consisting of allyl (2-methylbutoxy)acetate, allyl (3-methylbutoxy)acetate, allyl (cyclohexyloxy)acetate, 1-(5,5 -dimethyl-1-cyclohexen-1-yl)-4-penten-1-one, 1-(3 ,3-dimethyl-1-cyclohexen-1-yl)-4-penten-1-one, 1-(5-ethyl-5-methyl-1-cyclohexen-1-yl)-4-penten-1-one, 1-[(1RS,2 SR,4SR)-bicyclo[2.2.1]hept-2-yl]-5-hexen-2-one, 1-(spiro[4.5]dec-7-en-7-yl)pent-4-en-1-one, 2-cyclohexyl-1,6-heptadien-3-one, diethyl 1,4-cyclohexanedicarboxylate, (−)-(2 S)-1-oxo-1-(2-propanyl oxy)-2-propanyl 2,2-dimethylprop anoate, (+/−)-3,7-dimethyl-1,6-octadi en-3-ol, or any combination thereof;

perfuming ingredient of group B is selected from the group consisting of benzyl acetate, benzyl propionate, 4-phenyl-2-butanone, cyclohexyl acetate, 3-methyl-2-buten-1-yl acetate, or any combination thereof;

perfuming ingredient of group C is selected from the group consisting of 5-heptyldihydro-2(3H)-furanone, 6-hexyltetrahydro-(2H)-pyran-2-one, 2,2,5-trimethyl-5-pentylcyclopentanone, 4-decanolide, (1'R)-2[2-(4-methyl-3 cyclohexen-1'-yl)propyl]cyclopentanone, 2-(5-hexen-1-yl)cyclopentanone, or any combination thereof;

perfuming ingredient of group D is selected from the group consisting of tricyclo[5.2.1.$0^{2,}$ $^{6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S, 8 S/R)-tricyclo[5.2.1.$0^{2,6}$]dec-3-en-8-yl 2-methylpropanoate, (1R/S,2R/S,6R/S,7R/S, 8 S/R)-tricyclo[5.2.1.$0^{2,6}$ ]dec-4-en-8-yl 2-methylpropanoate, or any combination thereof.

5. The method according to claim 1, wherein the at least one perfuming ingredient imparting woody odor note is selected from the group consisting of compound groups E, F, G, H, or any mixture thereof, wherein:

perfuming ingredient of group E is selected from the group consisting of 4-(2-methyl-2-propanyl)cyclohexyl acetate, 1-(octahy dro-2,3,8,8-tetramethyl-2-naphtalenyl)-1-ethanone, 4-(2-methyl-2-propanyl)cyclohexanol, patchouli oil, (+/−)-methyl2-ethyl hexanoate, 1- [(1RS,2RS)-1,2,8,8-tetramethyl-1,2,3,4, 5,6,7,8-octahydro-2-naphthalenyl]ethenone, 1-((2RS, 3RS)-2, 3, 8, 8-tetramethyl-1,2,3,4,5,6,7, 8-octahydro-naphthal en-2-yl)ethenone, 1-[(2RS,3RS, 8aRS)-2,3,8, 8-tetramethyl-1,2,3,5,6,7, 8,8a-octahydro-2-naphthalenyl] ethenone, 1-[(1RS,2RS, 8aSR)-1,2, 8, 8-tetramethyl-1,2,3,5,6,7,8,8a-octahydro-2-naphthal enyl]ethanone, cedarwood oil, or any combination thereof;

perfuming ingredient of group F is selected from the group consisting of (+/−)-(3E)-3-methyl-4-(2,6, 6-trimethyl-2-cyclohexen-1-yl)-3-buten-2-one, (+/−)-(1E)-1-(2, 6,6-trimethyl-2-cyclohexen-1-yl)-1-penten-3-one, (E)-3-methyl-4-(2, 6, 6-trimethyl-2-cyclohexen-1-yl)-3-buten-2-one, or any combination thereof;

perfuming ingredient of group G is selected from the group consisting of 3,7-dimethyl-1,6-octadien-3-ol, 3,7-dimethyl-1,6-nonadien-3-ol, 3 ,7-dimethyl-1-octen-3-ol, 3,7-dimethyl-3-octanol, 4-cyclohexyl-2-methyl-2-butanol, propyl 2-(tert-pentyloxy)propanoate, (2Z)-4,8-dimethyl-2,7-nonadien-4-ol, or any combination thereof;

perfuming ingredient of group H is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S, 8S/R)-tricyclo[5.2.1.$0^{2,6}$]dec-3-en-8-yl 2-methylpropanoate, (1R/S,2R/S,6R/S,7R/S, 8S/R)-tricyclo[5.2.1.$0^{2,6}$]dec-4-en-8-yl 2-methylpropanoate, or any combination thereof.

6. The method according to claim 1, wherein the at least one perfuming ingredient imparting fresh odor note is selected from the group consisting of compound groups I, J, K, L, or any mixture thereof, wherein:

perfuming ingredient of group I is selected from the group consisting of 10-undecenal, decanal, undecanal, 9-undecenal, 10-undecenal, dodecanal, 2-methylundecanal, 5,9-dimethyl-4-decenal, methyl 2-((1RS,2RS)-3-oxo-2-pentylcyclopentyl)acetate, lavandin oil, or any combination thereof;

perfuming ingredient of group J is selected from the group consisting of allyl (2-methylbutoxy)acetate, allyl (3-methylbutoxy)acetate, allyl (cyclohexyloxy)acetate, 1-(5,5 -dimethyl-1-cyclohexen-1-yl)-4-penten-1-one, 1-(3 ,3-dimethyl-1-cyclohexen-1-yl)-4-penten-1-one, 1-(5-ethyl-5-methyl-1-cyclohexen-1-yl)-4-penten-1-one, 1-[(1R/S,2 S/R,4 S/R)-bicyclo[2.2. 1 ]hept-2-yl]-5-hexen-2-one, 1-(spiro[4.5]dec-7-en-7-yl)pent-4-en-1-one, 2-cyclohexyl-1,6-heptadien-3-one, or any combination thereof;

perfuming ingredient of group K is selected from the group consisting of 2,6,-dimethyl-7-octen-2-ol, 4-cyclohexyl-2-methyl-2-butanol, dihydroterpineol, 2,6-dimethyl-2-heptanol, 2,6-dimethyl-2-octanol, propyl 2-(tert-pentyloxy)propanoate, (2Z)-4,8-dimethyl-2,7-nonadien-4-ol, or any combination thereof;

perfuming ingredient of group L is selected from the group consisting of 3,7-dimethyl-1,6-octadien-3-ol (linalool), 3,7-dimethyl-1,6-nonadien-3-ol, 3,7-dimethyl-1-octen-3-ol, 3,7-dimethyl-3-octanol, 4-cyclohexyl-2-methyl-2-butanol, propyl2-(tert-pentyloxy) propanoate, (2Z)-4,8-dimethyl-2,7-nonadien-4-ol, or any combination thereof.

7. The method according to claim 1, wherein the at least one perfuming ingredient imparting floral odor note is selected from the group consisting of compound groups M, N, O, P, Q, R, S, T, or any mixture thereof, wherein:

perfuming ingredient of group M is selected from the group consisting of benzyl acetate, benzyl propionate, 4-phenyl-2-butanone, cyclohexyl acetate, 3-methyl-2-buten-1-yl acetate, (+-)-(3-methoxy-2-methylpropyl) benzene, methyl 2-((1RS,2RS)-3-oxo-2-pentyl cyclopentyl)acetate, (−)-(2S)-1-oxo-1-(2-propanyloxy)-2-propnyl 2,2-dimethylpropanoate, 2-hexyl-3-phenyl-2-propenal, or any combination thereof;

perfuming ingredient of group N is selected from the group consisting of 3,7-dimethyl-6-octen-1-ol, 3-[(1R)-4-methyl-3-cyclohexen-1-yl]-1-butanol, 3-methyl-5-phenyl-1-pentanol, 3 , 7-dimethyl-2,6 -ocradien-1-ol, 4-methyl-6-phenyl-2-hexanol, a mixture comprising (+/−)-4,7,9-trimethyldecan-2-ol and (+/−)-4,6,8-trimethyldecan-2-ol and (+/−)-2,4,6,8-tetramethylnonan-1-ol and (+/−)-3,8,9-trimethyldecan-2-ol and (+/−)-2,3,6,7-tetramethylnonan-1-ol, or any combination thereof;

perfuming ingredient of group O selected from the group consisting of (+/−)-(3E)-3-methyl-4-(2,6, 6-trimethyl-2-cyclohexen-1-yl)-3-buten-2-one, (+/−)-(1E)-1-(2,6, 6-tr methyl-2-cyclohexen-1-yl)-1-penten-3-one, (E)-3-methyl-4-(2,6,6-tri methyl-2-cyclohexen-1-yl)-3-buten-2-one, or any combination thereof;

perfuming ingredient of group P is selected from the group consisting of 3,7-dimethyl-1 , 6-octadi en-3-ol, 3 ,7-dimethyl-1 ,6-nonadi en-3-ol, 3,7-dimethyl-1-octen-3-ol, 3,7-dimethyl-3-octanol, 4-cyclohexyl-2-methyl-2-butanol, propyl2-(tert-pentyloxy)propanoate, (2Z)-4, 8-dimethyl-2,7-nonadien-4-ol, or any combination thereof;

perfuming ingredient of group Q is selected from the group consisting of methyl benzoate, ethyl benzoate, methyl cyclopentylideneacetate, or any combination thereof;

perfuming ingredient of group R is selected from the group consisting of 1-(2-naphthyl)ethanone, 1-(5,6,7, 8-tetrahydro-2-naphthalenyl)ethanone, 2-methoxynaphthalene, methylanthranilate, or any combination thereof;

perfuming ingredient of group S is selected from the group consisting of 2-phenylethanol, 2-phenylethyl acetate, 3-methyl-5-phenyl-1-pentanol, cyclohexylidene(phenyl)acetonitrile, or any combination thereof;

perfuming ingredient of group T is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S, 8S/R)-tricyclo[5.2.1.$0^{2,6}$]dec-3-en-8-yl 2-methylpropanoate, (1R/S,2R/S,6R/S,7R/S,8S/R)-tricyclo[5.2.1.$0^{2,6}$]dec-4-en-8-yl 2-methylpropanoate, or any combination thereof.

8. The method according to claim 1, wherein the at least one pro-perfume compound is added in an olfactory effective amount.

9. A perfumed composition comprising at least one pro-perfume compound according to formula (I) as defined in claim 1, at least one perfuming ingredient imparting fruity and/or woody and/or fresh and/or floral and/or green odor note, optionally at least one ingredient selected from the group consisting of a perfumery carrier and one or more perfuming co-ingredients, and optionally, at least one perfumery adjuvant.

10. The perfumed composition according to claim 9, wherein the at least one pro-perfume compound is present in the perfumed composition in an effective amount to confer, improve, enhance or modify the freshness of the perfumed composition.

11. The perfumed composition according to claim 9, wherein the at least one pro-perfume compound is present in an amount of from 0.05 to 30 wt. %, based on the total weight of the perfumed composition.

12. A perfumed consumer product comprising the perfumed composition according to claim 9.

13. The method according to claim 2, wherein R represents a $C_6$-$C_{15}$ alkyl or alkenyl group.

14. The method according to claim 1, wherein the perfuming composition comprises at least one perfuming ingredient imparting fruity odor note, at least one perfuming ingredient imparting woody odor note, at least one perfuming ingredient imparting fresh odor note and at least one perfuming ingredient imparting floral odor note.

15. The method according to claim 14, wherein:

(1) the at least one perfuming ingredient imparting fruity odor note is selected from the group consisting of compound groups A, B, C, D, or any mixture thereof, wherein:

perfuming ingredient of group A is selected from the group consisting of allyl (2-methylbutoxy)acetate, allyl (3-methylbutoxy)acetate, allyl (cyclohexyloxy) acetate, 1-(5,5-dimethyl-1-cyclohexen-1-yl)-4-penten-1-one, 1-(3,3-dimethyl-1-cyclohexen-1-yl)-4-penten-1-one, 1-(5-ethyl-5-methyl-1-cyclohexen-1-yl)-4-penten-1-one, [(1RS,2 SR,4SR)-bicyclo [2.2.1]hept-2-yl]-5-hexen-2-one,1-(spiro[4.5]dec-7-en-7-yl)pent-4-en-1-one, 2-cycl ohexyl-1,6-heptadien- 3-one, diethyl1,4-cyclohexanedicarboxylate, (−)-(2 S)-1-oxo-1-(2-propanyl oxy)-2-propanyl 2,2-dimethylpropanoate, (+/−)-3,7-dimethyl-1,6-octadien-3-ol, or any combination thereof;

perfuming ingredient of group B is selected from the group consisting of benzyl acetate, benzyl propionate, 4-phenyl-2-butanone, cyclohexyl acetate, 3-methyl-2-buten-1-yl acetate, or any combination thereof;

perfuming ingredient of group C is selected from the group consisting of 5-heptyldihydro-2(3H)-furanone, 6-hexyltetrahydro-(2H)-pyran-2-one, 2,2,5-trimethyl-5-pentylcyclopentanone, 4-decanolide, (1'R)-2-[2-(4'-methyl-3'-cyclohexen-1'-yl)propyl] cyclopentanone, 2-(5-hexen-1-yl)cyclopentanone, or any combination thereof;

perfuming ingredient of group D is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S, 6R/S,7R/S, 8 S/R)-tricyclo[5.2.1.$0^{2,6}$]dec-3-en-8-yl 2-methylpropanoate, (1R/S,2R/S,6R/S,7R/S, 8 S/R)-tricyclo[5.2.1.$0^{2,6}$]dec-4-en-8-yl 2-methylpropanoate, or any combination thereof;

(2) the at least one perfuming ingredient imparting woody odor note is selected from the group consisting of compound groups E, F, G, H, or any mixture thereof, wherein:

perfuming ingredient of group E is selected from the group consisting of 4-(2-methyl-2-propanyl)cyclohexyl acetate, 1-(octahy dro-2,3,8,8-tetramethyl-2-naphtal enyl)-1-ethanone, 4-(2-methyl-2-propanyl) cyclohexanol, patchouli oil, (+/−)-methyl 2-ethylhexanoate, 1- [(1RS,2RS)-1,2,8,8-tetramethyl-1,2,3,4,5,6,7,8-octahydro-2-naphthalenyl] ethenone, 1-((2RS, 3RS)-2,3,8,8-tetramethyl-1,2,3, 4,5,6,7,8-octahydronaphthal en-2-yl)ethenone, 1-[(2RS,3RS, 8aRS)-2,3,8,8-tetramethyl-1,2,3,5,6,7, 8,8a-octahydro-2-naphthal enyl]ethenone, 1-[(1RS, 2RS,8aSR)-1,2,8,8-tetramethyl-1,2,3,5,6,7,8,8a-octahydro-2-naphthalenyl]ethanone, cedarwood oil, or any combination thereof;

perfuming ingredient of group F is selected from the group consisting of (+/−)-(3E)-3-methyl-4-(2,6, 6-trimethyl-2-cyclohexen-1-yl)-3-buten-2-one, (+/−)-(1E)-1-(2, 6,6- trimethyl-2-cy clohexen-1-yl)-1-penten-3-one, (E)-3-methyl-4-(2,6,6-trimethyl-2-cyclohexen-1-yl)-3-buten-2-one, or any combination thereof;

perfuming ingredient of group G is selected from the group consisting of 3,7-dimethyl-1,6-octadi en-3-ol, 3 ,7-dimethyl-1,6-nonadi en-3-ol, 3 ,7-dimethyl-1-octen-3-ol, 3,7-dimethyl-3-octanol, 4-cyclohexyl-2-methyl-2-butanol, propyl 2-(tert-pentyloxy)propanoate, (2Z)-4,8-dimethyl-2,7-nonadien-4-ol, or any combination thereof;

perfuming ingredient of group H is selected from the group consisting of tri cycl o[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S,6R/S,7R/S, 8 S/R)-tricycl o[5.2.1.$0^{2,6}$]dec-3-en-8-yl 2-methylpropanoate, (1R/S,2R/S,6R/S,7R/S,8 S/R)-tri cyclo[5.2.1.$0^{2,6}$]dec-4-en-8-yl 2-methylpropanoate, or any combination thereof;

(3) the at least one perfuming ingredient imparting fresh odor note is selected from the group consisting of compound groups I, J, K, L, or any mixture thereof, wherein:

perfuming ingredient of group I is selected from the group consisting of 10-undecenal, decanal, undecanal, 9-undecenal, 10-undecenal, dodecanal, 2-methylundecanal, 5,9-dimethyl-4-decenal, methyl 2-((1RS,2RS)-3-oxo-2-pentylcyclopentyl)acetate, lavandin oil, or any combination thereof;

perfuming ingredient of group J is selected from the group consisting of allyl (2-methylbutoxy)acetate, allyl (3-methylbutoxy)acetate, allyl (cyclohexyloxy)acetate, 1-(5,5-dimethyl-1-cycl ohexen-1-yl)-4-penten-1-one, 1-(3 ,3-dimethyl-1-cycl ohexen-1-yl)-4-penten-1-one, 1-(5-ethyl-5-methyl-1-cyclohexen-1-yl)-4-penten-1-one, 1-[(1R/S,2 S/R,4 S/R)-bicyclo[2.2.1]hept-2-yl]-5-hexen-2-one, 1-(spiro[4 .5]dec-7-en-7-yl)pent-4-en-1-one, 2-cyclohexyl-1,6-heptadien-3-one, or any combination thereof;

perfuming ingredient of group K is selected from the group consisting of 2,6,-dimethyl-7-octen-2-ol, 4-cyclohexyl-2-methyl-2-butanol, dihydroterpineol, 2,6-dimethyl-2-heptanol, 2,6-dimethyl-2-octanol, propyl2-(tert-pentyloxy)propanoate, (2Z)-4,8-dimethyl-2,7-nonadien-4-ol, or any combination thereof;

perfuming ingredient of group L is selected from the group consisting of 3,7-dimethyl -1 ,6-octadien-3-ol (linalool), 3,7-dimethyl -1,6-nonadien-3-ol, 3 ,7-dimethyl -1-octen-3-ol, 3,7-dimethyl-3-octanol, 4-cyclohexyl-2-methyl-2-butanol, propyl2-(tert-pentyloxy)propanoate, (2Z)-4,8-dimethyl-2,7-nonadien-4-ol, or any combination thereof; and (4) the at least one perfuming ingredient imparting floral odor note is selected from the group consisting of compound groups M, N, O, P, Q, R, S, T, or any mixture thereof, wherein:

perfuming ingredient of group M is selected from the group consisting of benzyl acetate, benzyl propionate, 4-phenyl-2-butanone, cyclohexyl acetate, 3-methyl-2-buten-1-yl acetate, (+-)-(3-methoxy-2-methylpropyl)benzene, methyl 2-((1RS,2RS)-3-oxo-2-pentylcyclopentyl)acetate, (−)-(2 S)-1-oxo-1-(2-prop anyl oxy)-2-propanyl 2,2-dimethylpropanoate, 2-hexyl-3-phenyl-2-propenal, or any combination thereof;

perfuming ingredient of group N is selected from the group consisting of 3,7-dimethyl-6-octen-1-ol, 3-[(1R)-4-methyl-3-cyclohexen-1-yl]-1-butanol, 3-methyl-5-phenyl -1-p entanol, 3 , 7-dimethyl-2,6 -ocradien-1-ol, 4-methyl-6-phenyl-2-hexanol, a mixture comprising (+/−)-4,7,9-trimethyldecan-2-ol and (+/−)-4,6,8-trimethyldecan-2-ol and (+/−)-2,4,6,8-tetramethylnonan-1-ol and (+/−)-3,8,9-trimethyldecan-2-ol and (+/−)-2,3,6,7-tetramethylnonan-1-ol, or any combination thereof;

perfuming ingredient of group O selected from the group consisting of (+/−)-(3E)-3-methyl-4-(2,6, 6-trimethyl-2-cyclohexen-1-yl)-3-buten-2-one, (+/−)-(1E)-1-(2, 6,6-trimethyl-2-cyclohexen-1-yl)-1-penten-3-one, (E)-3-methyl-4-(2,6,6-trimethyl-2-cyclohexen-1-yl)-3-buten-2-one, or any combination thereof;

perfuming ingredient of group P is selected from the group consisting of 3,7-dimethyl -1,6-octadi en-3-ol, 3,7-dimethyl-1,6-nonadien-3-ol, 3,7-dimethyl -1-octen-3-ol, 3,7-dimethyl-3-octanol, 4-cyclohexyl-2-methyl-2-butanol, propyl2-(tert-pentyloxy)propanoate, (2Z)-4,8-dimethyl-2,7-nonadien-4-ol, or any combination thereof;

perfuming ingredient of group Q is selected from the group consisting of methyl benzoate, ethyl benzoate, methyl cyclopentylideneacetate, or any combination thereof;

perfuming ingredient of group R is selected from the group consisting of 1-(2-naphthyl)ethanone, 1-(5,6, 7,8-tetrahydro-2-naphthalenyl)ethanone, 2-methoxynaphthalene, methylanthranilate, or any combination thereof;

perfuming ingredient of group S is selected from the group consisting of 2-phenylethanol, 2-phenylethyl acetate, 3-methyl-5-phenyl-1-pentanol, cyclohexylidene(phenyl)acetonitrile, or any combination thereof;

perfuming ingredient of group T is selected from the group consisting of tricyclo[5.2.1.$0^{2,6}$]dec-3-en-8-yl acetate, tricyclo[5.2.1.$0^{2,6}$]dec-4-en-8-yl acetate, tricyclo [5.2.1.$0^{2,6}$]dec-3-en-8-yl propanoate, tricyclo [5.2.1.$0^{2,6}$]dec-4-en-8-yl propanoate, (1R/S,2R/S, 6R/S,7R/S, 8S/R)-tricyclo[5.2.1.$0^{2,6}$]dec-3-en-8-yl 2-methylpropanoate, (1R/S,2R/S,6R/S,7R/S,8S/R)-tricyclo[5.2.1.$0^{2,6}$]dec-4-en-8-yl 2-methylpropanoate, or any combination thereof.

16. The method according to claim 8, wherein the at least one pro-perfume compound is added in an amount of from 0.1 to 80 wt. % based on the total weight of the perfuming composition.

17. The method according to claim 8, wherein the at least one pro-perfume compound is added in an amount of from 0.5 to 40 wt. % based on the total weight of the perfuming composition.

18. The method according to claim 8, wherein the at least one pro-perfume compound is added in an amount of from 1.5 to 19 wt. % based on the total weight of the perfuming composition.

* * * * *